(12) United States Patent
Hisai

(10) Patent No.: US 12,345,318 B1
(45) Date of Patent: Jul. 1, 2025

(54) SEPARATION STRUCTURE OF INTERNAL GEAR AND HOUSING, PLANETARY GEAR DEVICE AND ACTUATOR

(71) Applicant: Enplas Corporation, Saitama (JP)

(72) Inventor: Koki Hisai, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 18/588,024

(22) Filed: Feb. 27, 2024

(51) Int. Cl.
| F16H 57/00 | (2012.01) |
| F16H 1/34 | (2006.01) |
| F16H 1/46 | (2006.01) |
| F16H 19/08 | (2006.01) |
| F16H 57/02 | (2012.01) |
| F16H 57/023 | (2012.01) |

(52) U.S. Cl.
CPC .......... F16H 57/0006 (2013.01); F16H 1/34 (2013.01); F16H 19/08 (2013.01); F16H 57/023 (2013.01); F16H 1/46 (2013.01); F16H 2057/02034 (2013.01); F16H 2057/02073 (2013.01)

(58) Field of Classification Search
CPC .............. F16H 57/0006; F16H 57/023; F16H 2057/02034; F16H 1/34
See application file for complete search history.

(56) References Cited

U.S. PATENT DOCUMENTS

| 4,838,123 A | 6/1989 | Matoba |
| 6,729,812 B2* | 5/2004 | Yaksich .............. B23B 31/1238 |
| | | 279/62 |
| 11,235,661 B1* | 2/2022 | Bonny .................. F16H 57/082 |
| 11,674,587 B2* | 6/2023 | Hisai ..................... E05F 15/611 |
| | | 475/82 |
| 12,209,638 B2* | 1/2025 | Ott ........................ F16H 57/082 |
| 2022/0025965 A1 | 1/2022 | Hisai et al. |

FOREIGN PATENT DOCUMENTS

JP 06-074835 9/1994

* cited by examiner

Primary Examiner — Huan Le

(57) ABSTRACT

A separation structure of internal gear and housing includes an internal gear including a tubular body that has an inner circumferential surface and internal-gear teeth formed on the inner circumferential surface. The separation structure also includes a tubular housing configured to accommodate the internal gear. The tubular body includes a flange formed on an outer circumferential surface of the tubular body and projecting radially outward. The flange extends continuously and circumferentially along the tubular body, and the flange has a recess formed at an outer circumferential surface of the flange. A gap is formed between the outer circumferential surface of the tubular body of the internal gear and an inner circumferential surface of the housing. The housing has a projection. Contact between the recess of the flange and the projection of the housing restricts circumferential movement of the internal gear.

13 Claims, 16 Drawing Sheets ical accuracy and can reduce the transmission of vibration from the planetary gear train and the noise generated by the planetary gear device, to provide a planetary gear device equipped with the separation structure, and also to provide an actuator equipped with the planetary gear device.

SEPARATION STRUCTURE OF INTERNAL GEAR AND HOUSING, PLANETARY GEAR DEVICE AND ACTUATOR

TECHNICAL FIELD

The present invention relates to a separation structure of internal gear and housing, a planetary gear device equipped with the separation structure, and an actuator equipped with the planetary gear device.

BACKGROUND ART

Planetary gear devices are used for automobiles, robots, and various others. A planetary gear device is formed of multiple gears and generates noise and vibration during operation. Various techniques for reducing the generation of noise and vibration of the operating planetary gear device have been proposed.

As one of such techniques, PTL 1 discloses a planetary gear device that has a structure in which an internal gear is separated from a housing and a gap is provided therebetween. The separate structure of the internal gear and the housing hinders the transmission of vibration from the internal gear to the housing and thereby reduces the noise caused by the vibration.

CITATION LIST

Patent Literature

PTL 1: Japanese Examined Patent Application Publication No. H6-74835

SUMMARY OF INVENTION

Technical Problem

In the planetary gear device of PTL 1, the outer circumferential surface of the internal gear and the inner circumferential surface of the housing are shaped so as to engage each other with a gap formed therebetween.

The internal gear has a tubular body. Gear teeth are formed on the inner circumferential surface of the tubular body, and multiple projections are formed on the outer circumferential surface of the tubular body. Each projection protrudes radially outward from the outer circumferential surface and extends in the axial direction. The projections are arranged at predetermined intervals in the circumferential direction.

Due to the presence of the projections, the thickness of the tubular body of the internal gear is not constant in the circumferential direction, which causes uneven contraction and may deteriorate dimensional accuracy of the internal gear when the internal gear is formed by resin molding and removed from the mold. Although internal gears are molded with such uneven contraction being taken into account, it is desirable to further improve the dimensional accuracy of the internal gear.

In the known configuration described above, when the internal gear is displaced during the operation of the planetary gear device, the outer circumferential surface of the internal gear and the inner circumferential surface of the housing come into areal contact with each other due to the above structure of engagement. In the state of the internal gear being in areal contact with the housing, the vibration of the planetary gear train transmitted to the internal gear tends to propagate further to the housing and thereby cause the noise of the planetary gear device. It is desirable to reduce the noise during operation.

An object of the present invention is to provide a separation structure of internal gear and housing that can be manufactured with high dimensional accuracy and can reduce the transmission of vibration from the planetary gear train and the noise generated by the planetary gear device, to provide a planetary gear device equipped with the separation structure, and also to provide an actuator equipped with the planetary gear device.

Solution to Problem

A separation structure of internal gear and housing, according to the present invention, includes: an internal gear including a tubular body that has an inner circumferential surface and internal-gear teeth formed on the inner circumferential surface; and a tubular housing configured to accommodate the internal gear, in which the tubular body includes a flange formed on an outer circumferential surface of the tubular body and projecting radially outward, the flange extends continuously and entirely circumferentially along the tubular body and includes a recess formed at an outer circumferential surface of the flange, a gap is formed between the outer circumferential surface of the internal gear and an inner circumferential surface of the housing, and contact between the recess of the flange and a projection of the housing restricts circumferential movement of the internal gear.

A planetary gear device according to the present invention includes: the separation structure of internal gear and housing described above; a single or a plurality of planetary gears meshing with the internal gear; a sun gear positioned at a center of the single or the plurality of planetary gears and configured to mesh with the single or the plurality of planetary gears; and a carrier configured to rotatably support the single or the plurality of planetary gears.

An actuator according to the present invention includes: the planetary gear device; and a motor connected to the planetary gear device and configured to drive the planetary gear device.

Advantageous Effects of Invention

The present invention can improve the dimensional accuracy of the internal gear in the manufacture and can reduce the transmission of vibration from the planetary gear train and reduce the noise generated by the planetary gear device.

DESCRIPTION OF EMBODIMENT

According to preferred embodiments, a separation structure of internal gear and housing, a planetary gear device, and an actuator will be described with reference to the drawings. In order to facilitate clear understanding, the orthogonal coordinate system having xyz axes is provided in each drawing, in which the x-axis extends parallel to the axis of actuator 1 according to embodiments of the present invention, and the y-axis and the z-axis orthogonally intersect the x-axis. In actuator 1 and the planetary gear device included in actuator 1, the planetary gear device has the central axis extending in the axial direction of actuator 1, and the circumferential direction is defined as the direction directed circumferentially around the central axis. The term "circumferential direction" is used when describing the planetary gear device as well as the parts thereof unless indicated otherwise.

(Embodiment 1) (Structure of Actuator 1)

Figure 1:
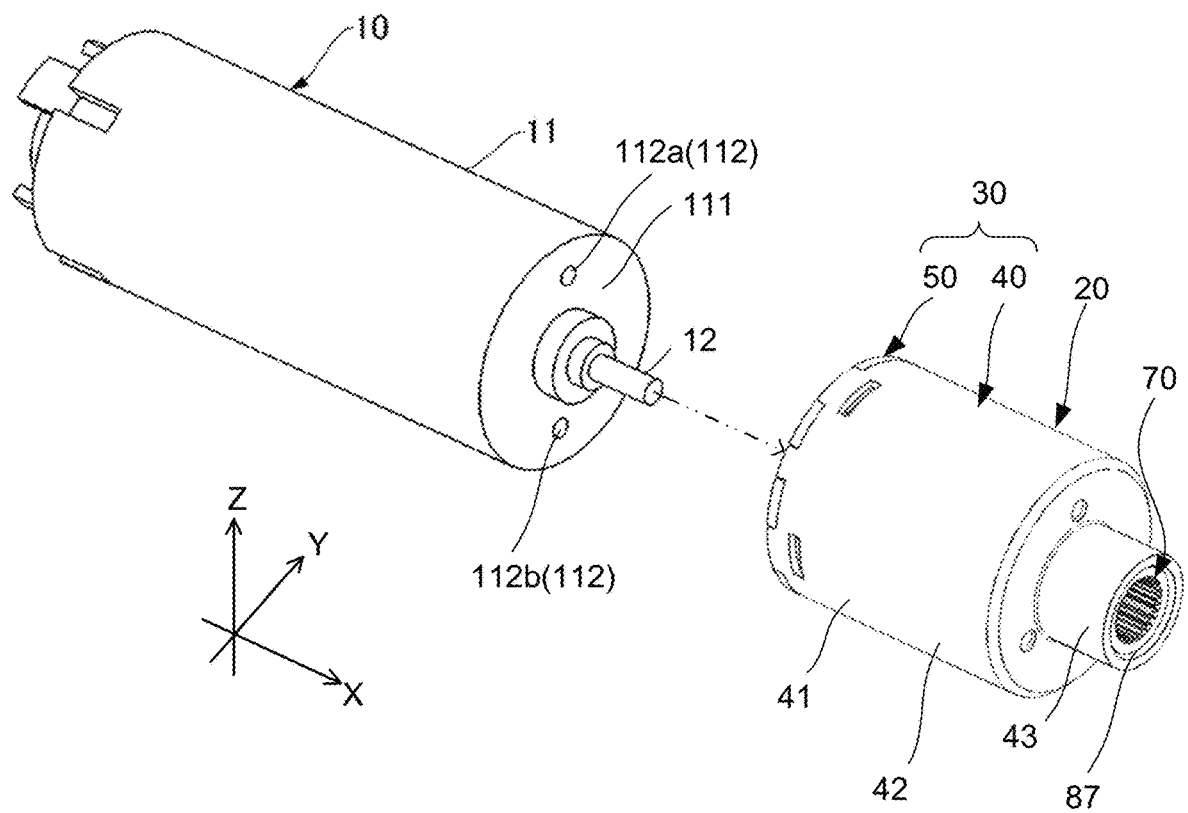
FIG. 1 is an exploded view illustrating an actuator according to Embodiment 1 of the present invention.

FIG. 1 is an exploded view illustrating an actuator according to Embodiment 1 of the present invention. Actuator 1 illustrated in FIG. 1 includes, for example, motor 10 and planetary gear device 20 connected to motor 10.

Motor 10 includes motor body 11 and shaft 12. Motor 10 drives planetary gear device 20 by rotating shaft 12 under the control of a control section (not illustrated).

Planetary gear device 20 inputs rotation from motor 10, reduce the speed of rotation with a predetermined reduction ratio, and outputs rotation from output-shaft connection portion 87 that is shaped like a pipe and to which an output gear is connected.

Figure 2:
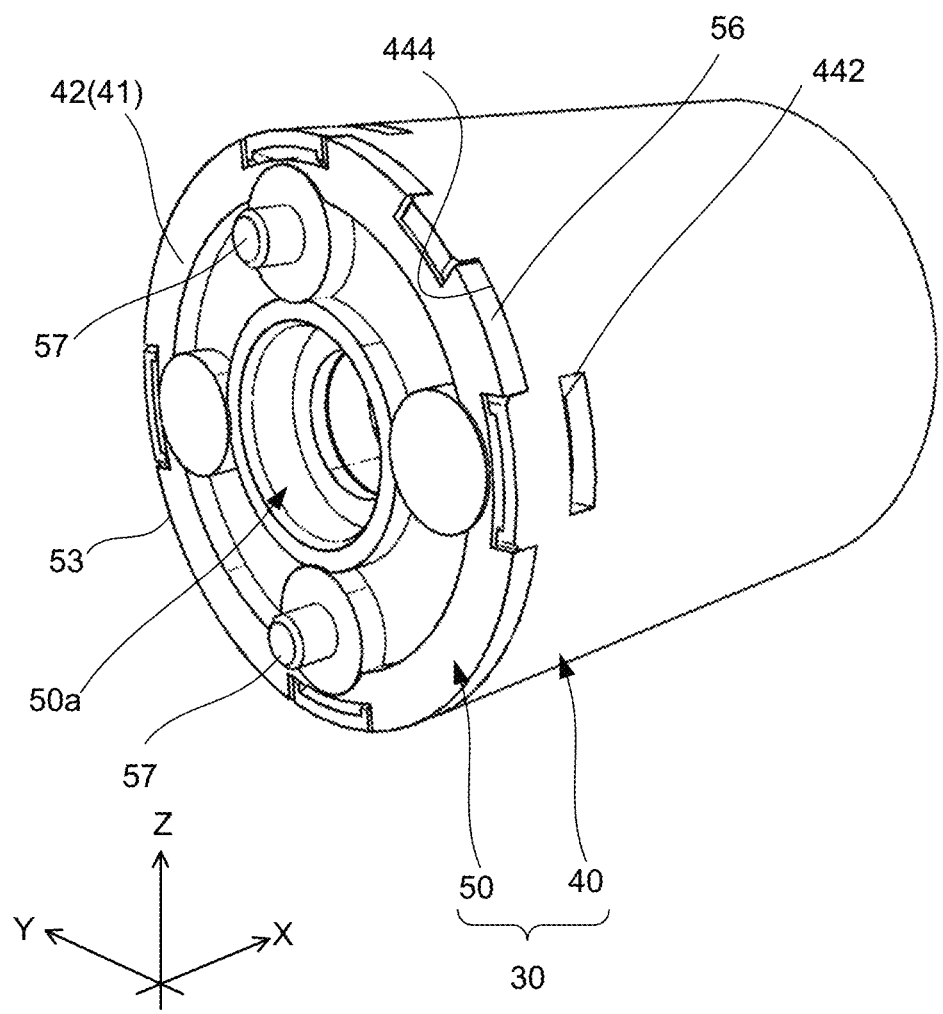
FIG. 2 is a perspective rear view illustrating a planetary gear device illustrated in FIG. 1.
Figure 3:
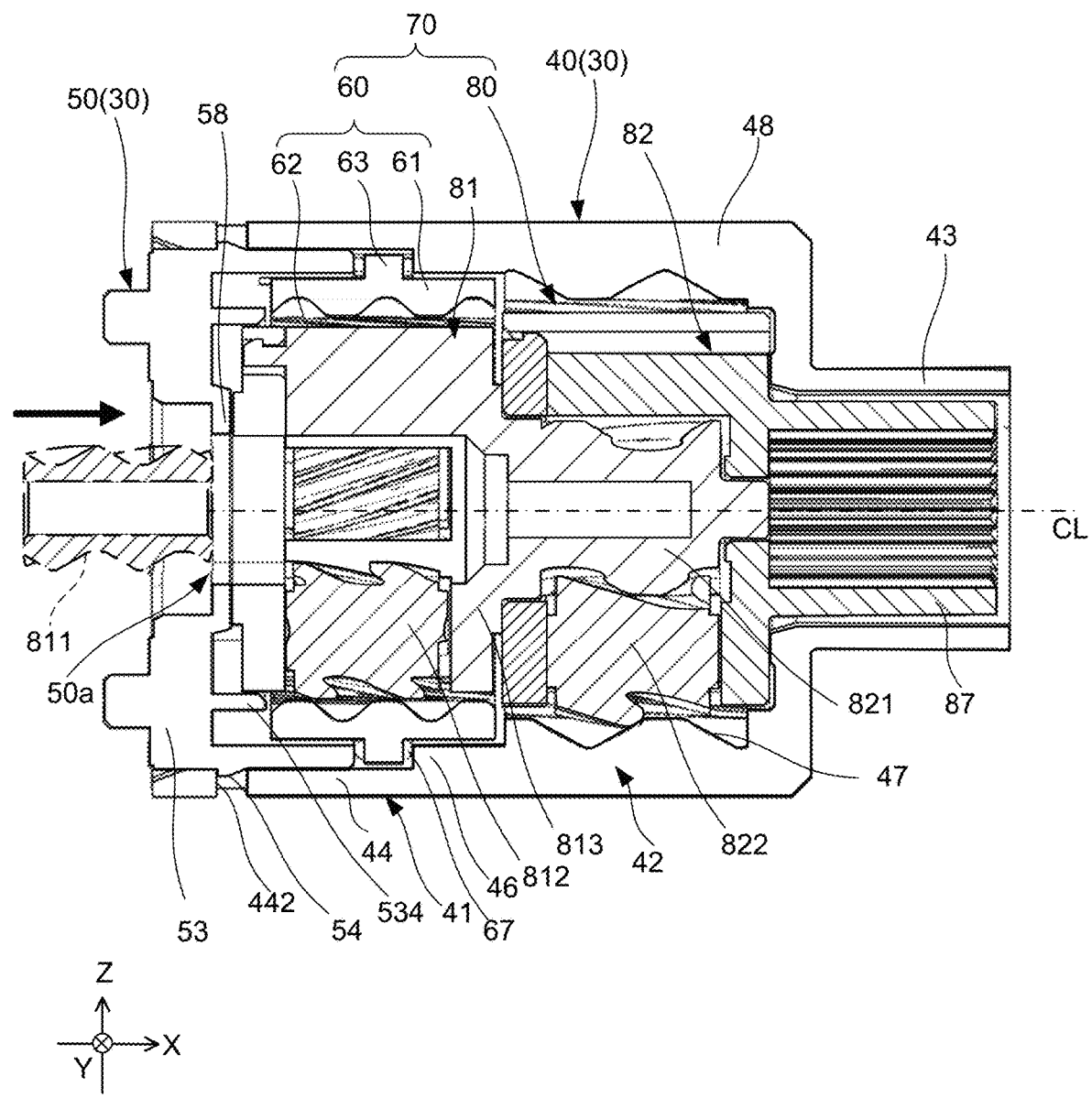
FIG. 3 is a longitudinal cross-sectional view of the planetary gear device.
Figure 4:
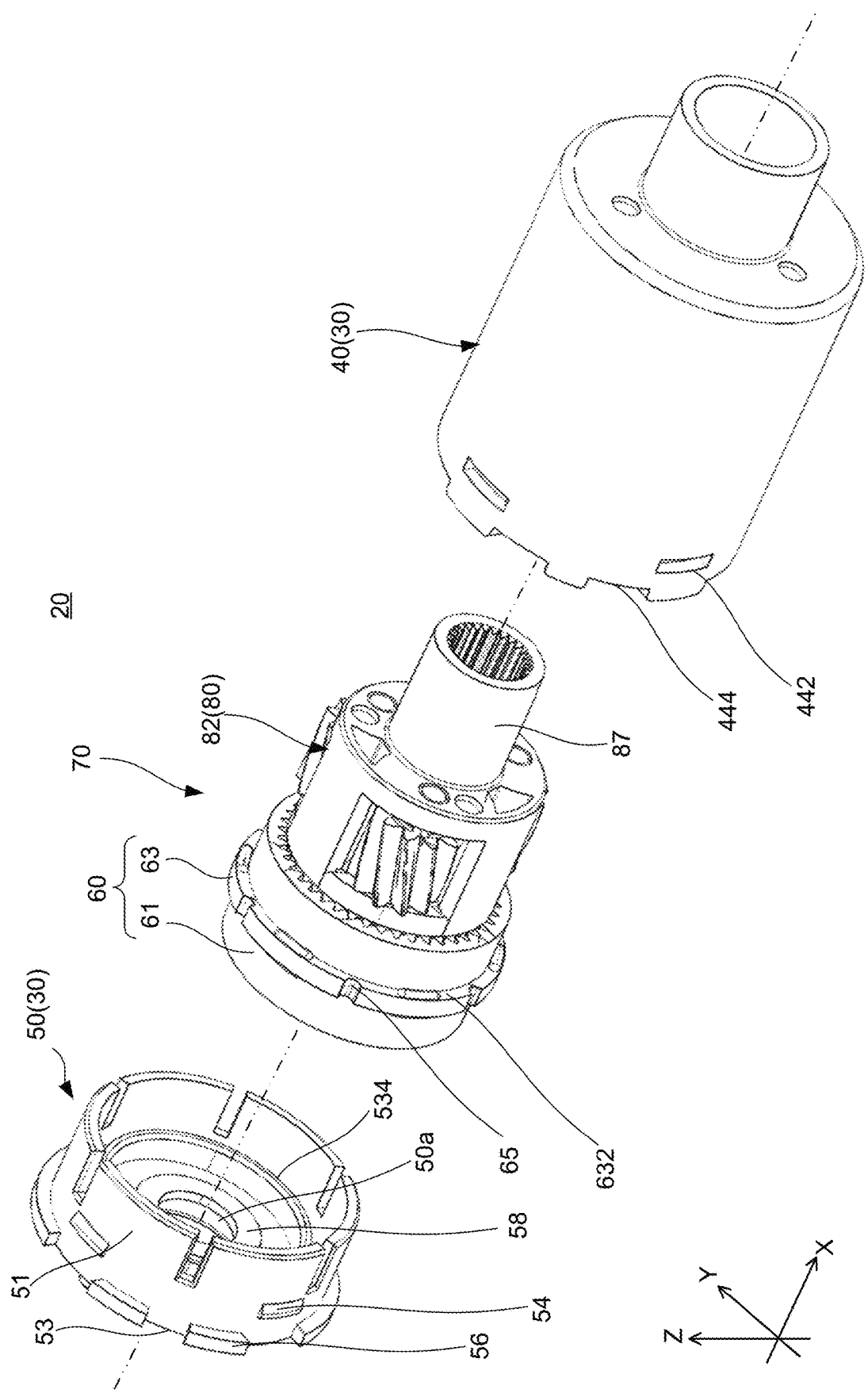
FIG. 4 is an exploded perspective view of the planetary gear device.
Figure 5:
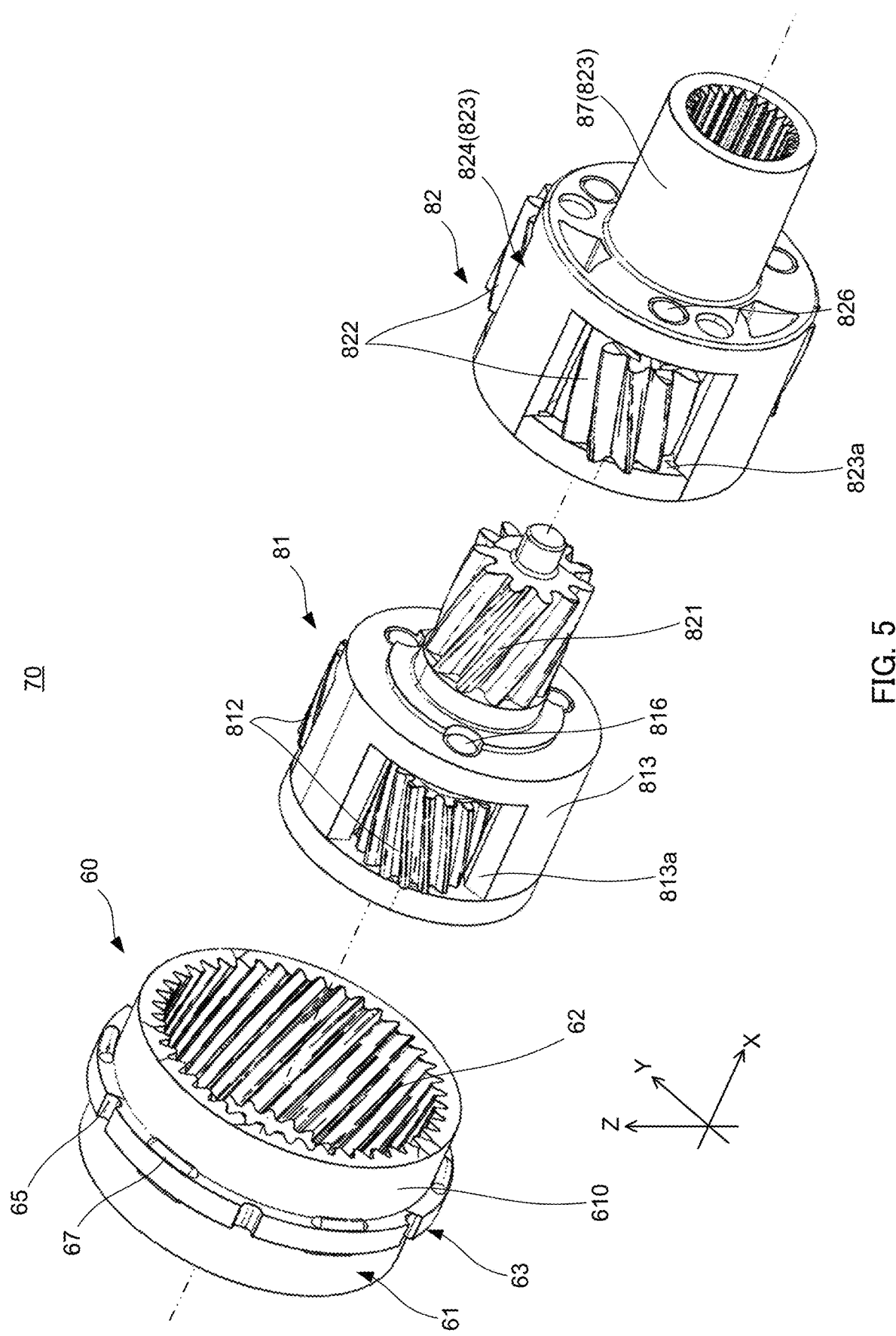
FIG. 5 is an exploded view illustrating a planetary gear-train section inside the planetary gear device.
Figure 6:
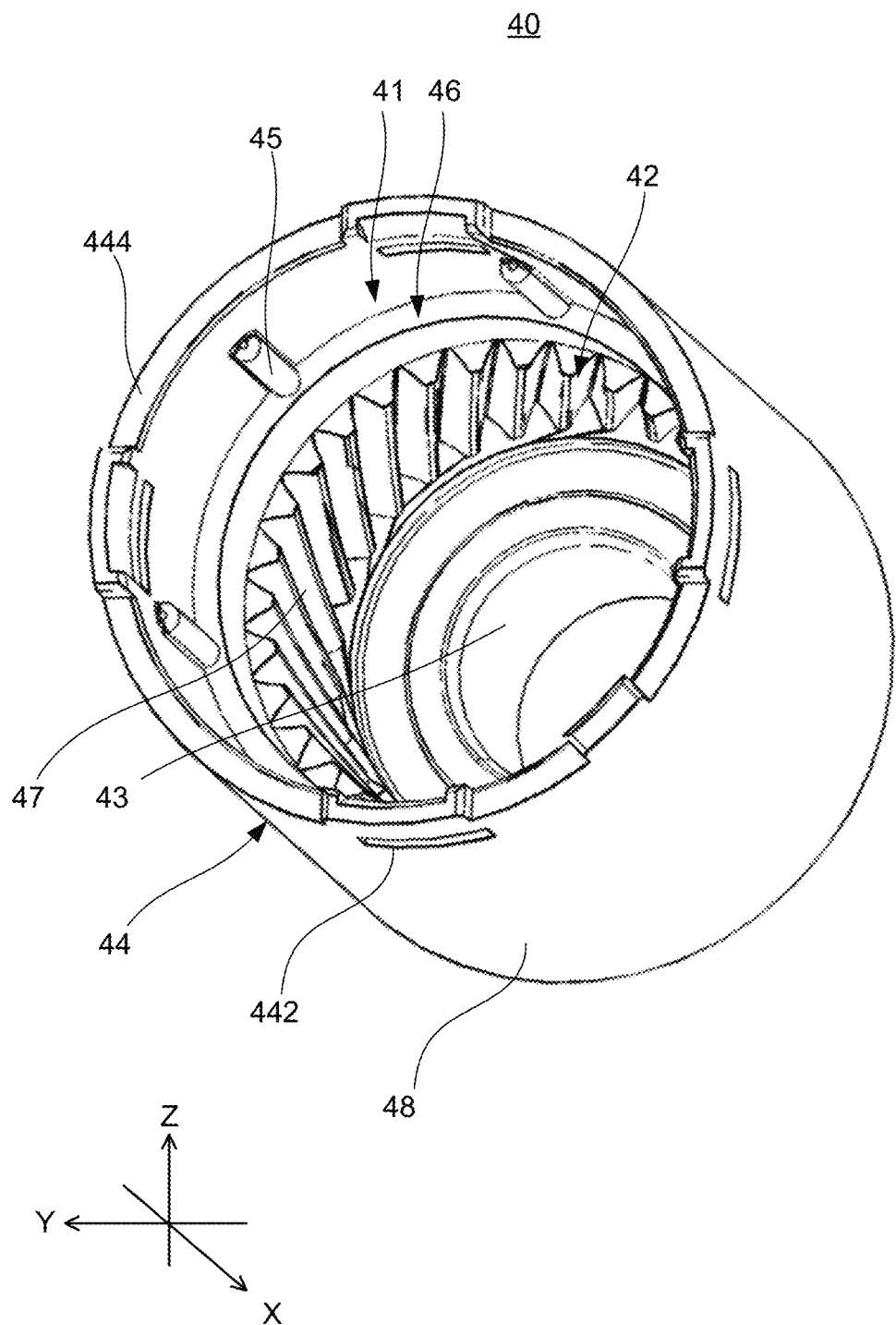
FIG. 6 is a perspective rear view illustrating a housing.
Figure 7:
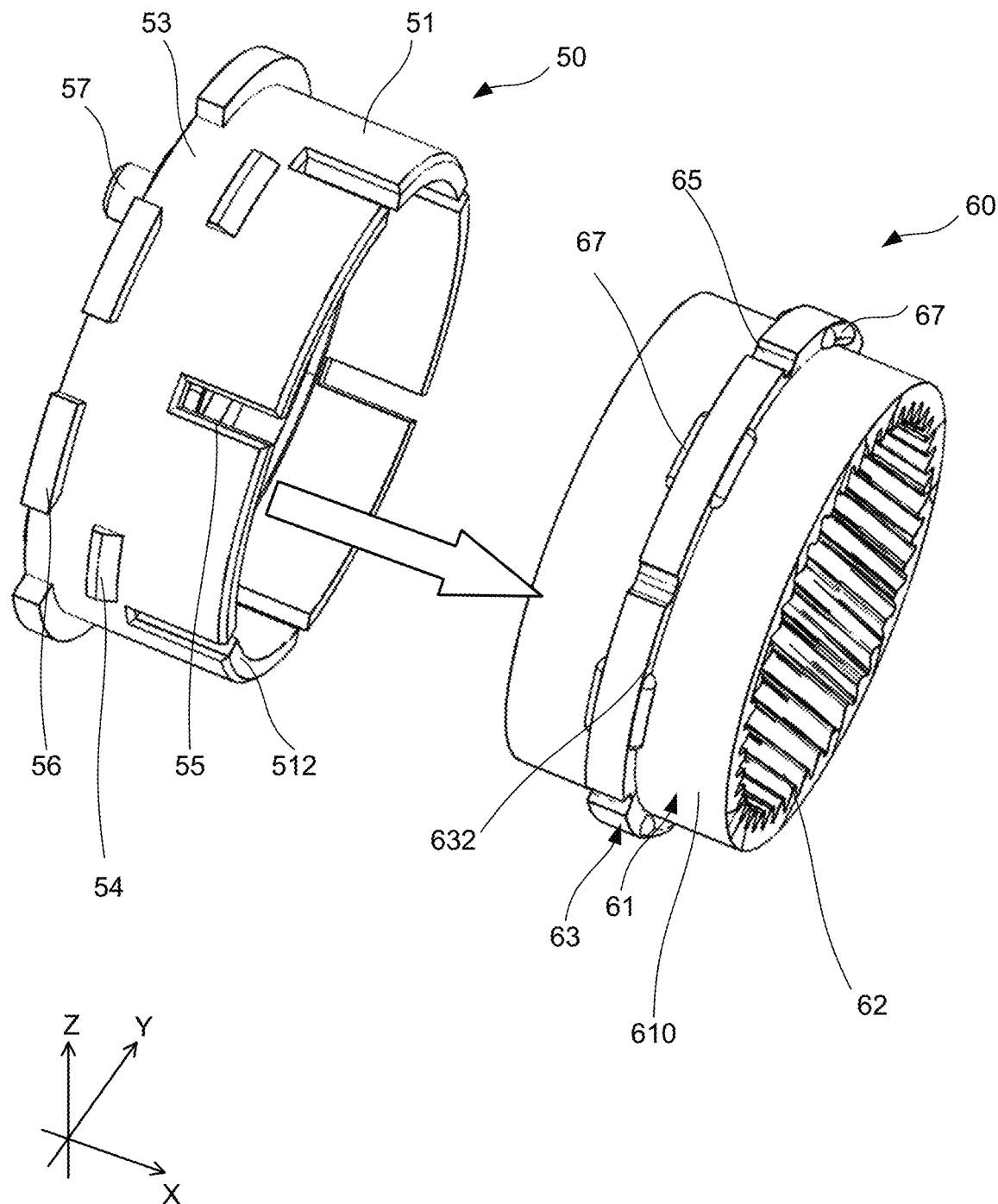
FIG. 7 is a perspective view illustrating an internal gear and a housing cover.

FIG. 2 is a perspective rear view of the planetary gear device illustrated in FIG. 1, and FIG. 3 is a longitudinal cross-sectional view of the planetary gear device. FIG. 4 is an exploded perspective view of the planetary gear device, and FIG. 5 is an exploded view of a planetary gear-train section inside the planetary gear device. FIG. 6 is a perspective rear view of the housing, and FIG. 7 is a perspective view illustrating an internal gear and a housing cover.

For example, as illustrated in FIGS. 2 to 7, planetary gear device 20 includes housing 30 and planetary gear-train section 70 accommodated in housing 30. Housing 30 includes housing body 40 and housing cover 50.

Tubularly shaped housing body 40 has an opening at an axial end thereof, and housing cover 50 is attached to the axial end of housing body 40 so as to close the opening, thereby forming housing 30.

As illustrated in FIGS. 4 and 5, planetary gear-train section 70 positioned inside housing 30 includes internal gear 60 and gear unit 80. Gear unit 80 further includes first gear train 81 and second gear train 82. First gear train 81 meshes with internal-gear teeth 62 of internal gear 60, and second gear train 82 meshes with first gear train 81.

Shaft 12 of motor 10 is connected to first gear train 81 of gear unit 80, which is a high-speed gear train. Gear unit 80 is accommodated in housing 30 in a suspended manner using first gear train 81 and internal gear 60 with minimum contact points between housing 30 and internal gear 60 with gear unit 80.

As illustrated in FIGS. 5 to 7, a structure including housing body 40, housing cover 50, and internal gear 60 of planetary gear-train section 70 is referred to as "separation structure". Planetary gear-train section 70 is accommodated in housing 30 of the separation structure.

Figure 8:
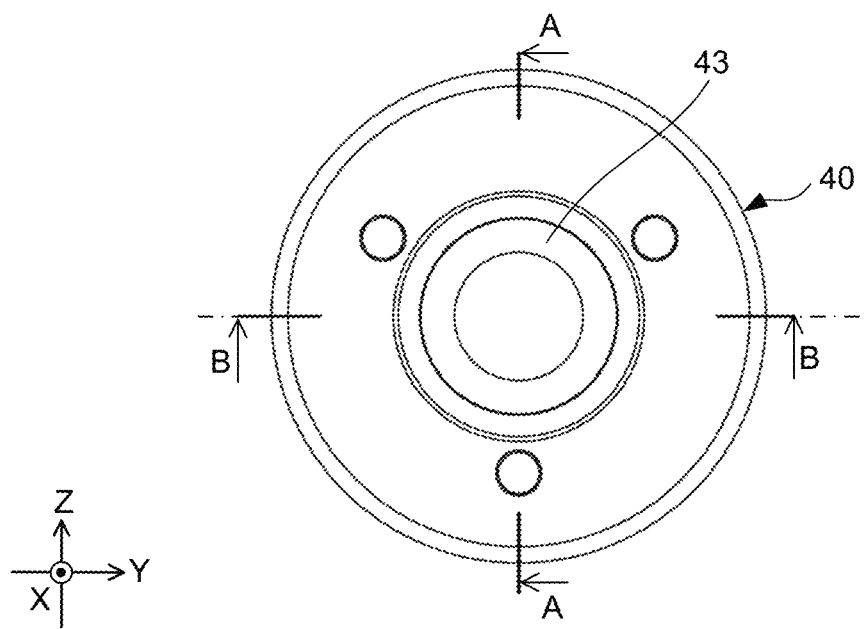
FIG. 8 is a front view illustrating a separation structure.
Figure 9:
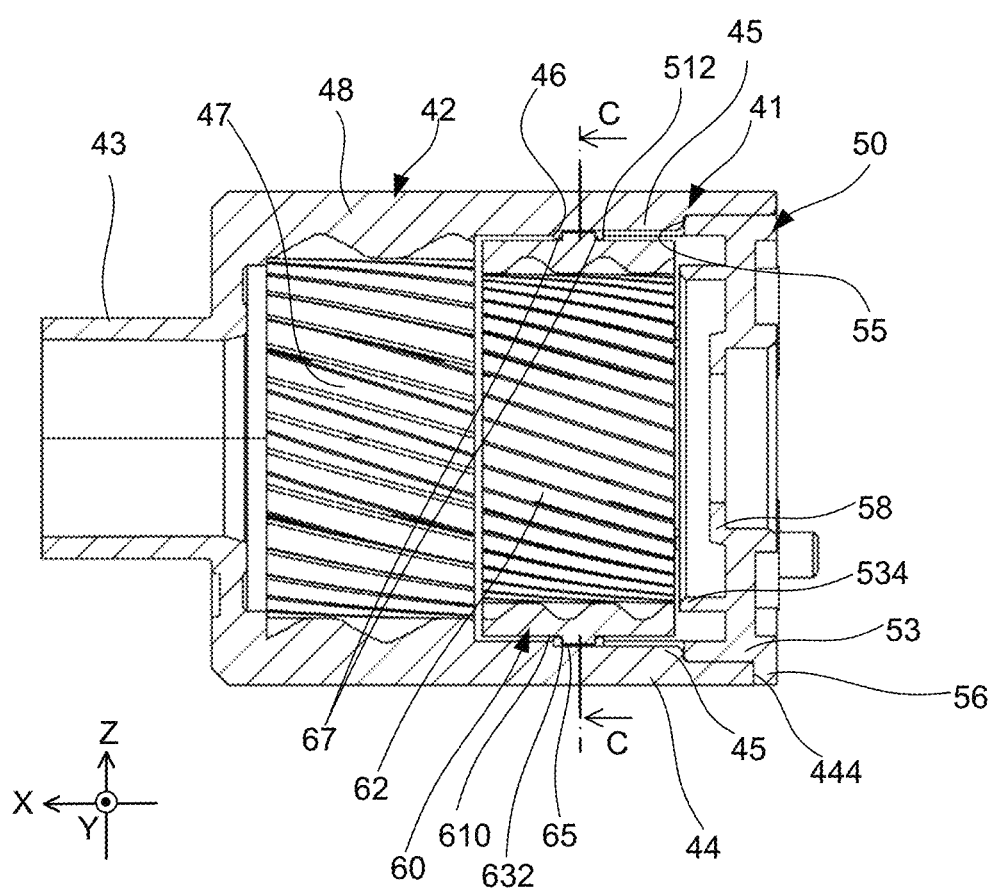
FIG. 9 is a cross-sectional view taken along line A-A in FIG. 8.
Figure 10:
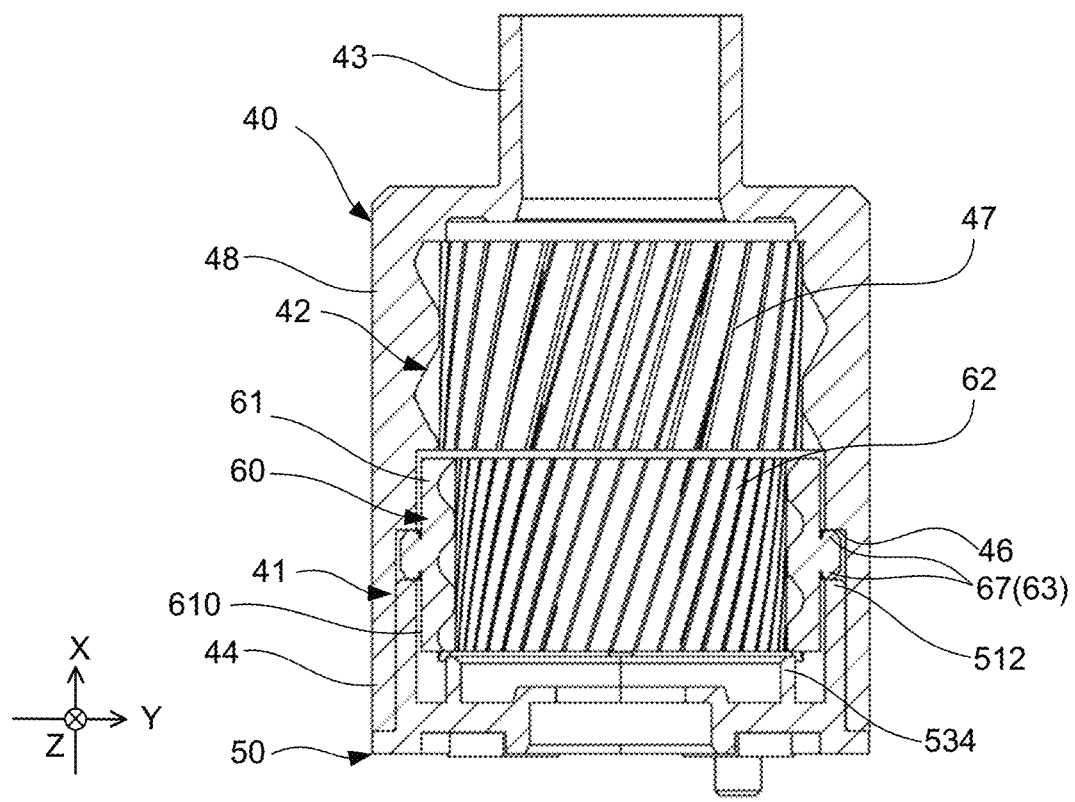
FIG. 10 is a cross-sectional view taken along line B-B in FIG. 8.
Figure 11:
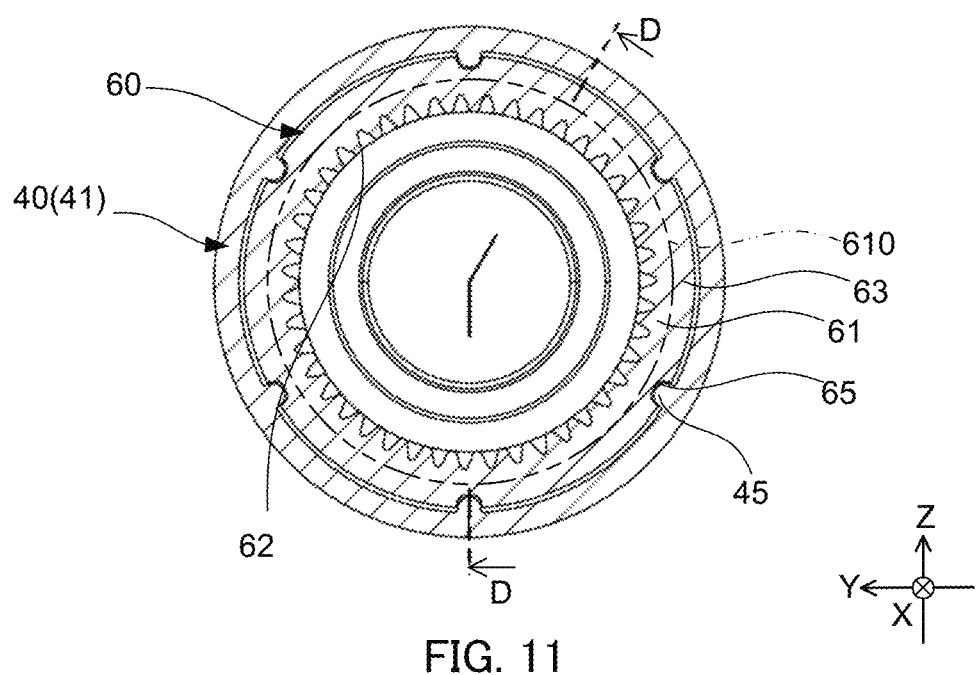
FIG. 11 is a cross-sectional view taken along line C-C in FIG. 9.
Figure 12:
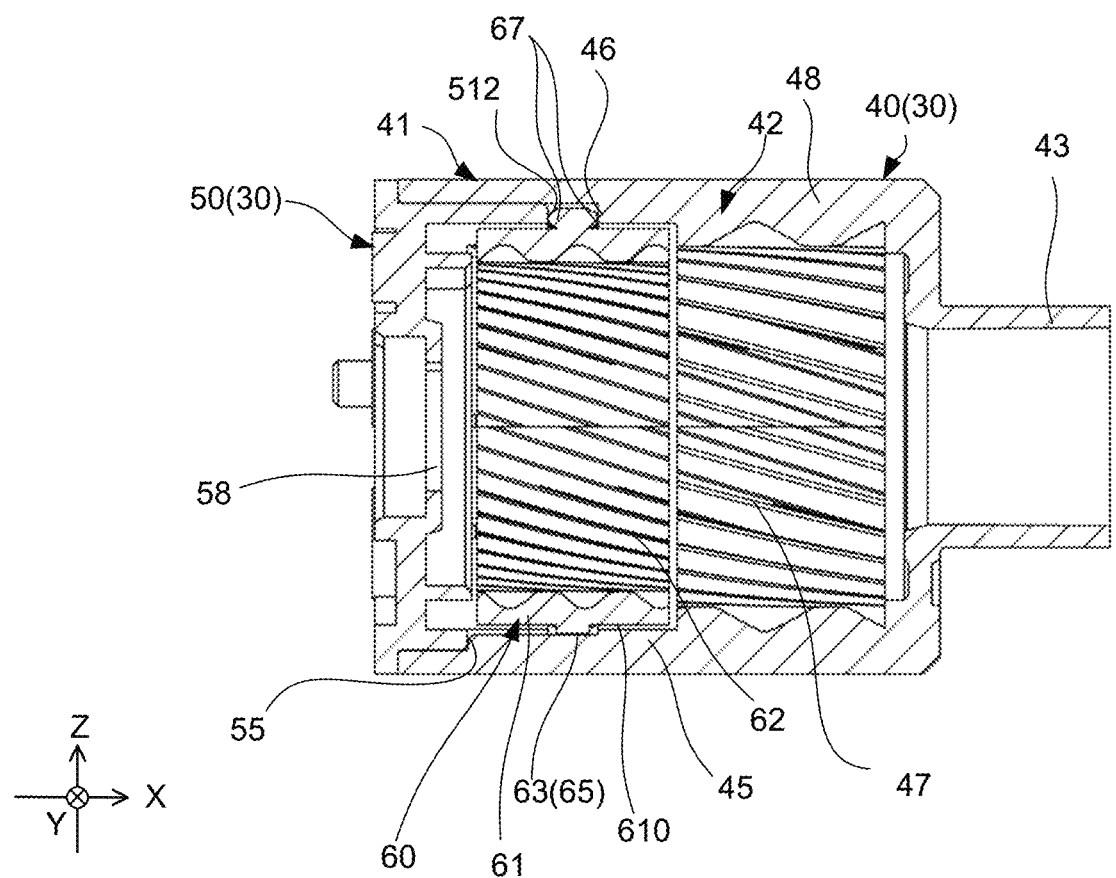
FIG. 12 is a cross-sectional view taken along line D-D in FIG. 11.

In the course of describing the separation structure, planetary gear-train section 70 is also described. FIG. 8 is a front view of the separation structure. FIG. 9 is a cross section taken along line A-A in FIG. 8, and FIG. 10 is a cross section taken along line B-B in FIG. 8. FIG. 11 is a cross section taken along line C-C in FIG. 9, and FIG. 12 is a cross section taken along line D-D in FIG. 11.

(Housing Body 40)

For example, as illustrated in FIGS. 3, 4, and 6 and in FIGS. 8 to 12, one side (a first side) of housing body 40 to which housing cover 50 is attached is open. As illustrated in FIGS. 3 to 5, planetary gear-train section 70 is put into housing body 40 from this opening.

For example, as illustrated in FIGS. 3, 4 and 6, housing body 40 includes first accommodation section 41 and second accommodation section 42, both of which are shaped tubularly. First accommodation section 41 accommodates internal gear 60 and first gear train 81. Second accommodation section 42 is continuous to the output side of first accommodation section 41 in the axial direction and accommodates second gear train 82. Tubular portion 43 is formed so as to be continuous to the output side (low-speed side) of second accommodation section 42. Output-shaft connection portion 87 of second gear train 82 protrudes through tubular portion 43.

For example, as illustrated in FIG. 6, first accommodation section 41 of housing body 40 includes cylindrically shaped first tubular portion 44, stopper (projection) 45, and step portion 46. Housing cover 50 has tubular insertion portion 51, and tubular insertion portion 51 is inserted in, and thereby closes, the opening of first tubular portion 44.

Stopper 45 and step portion 46 are formed at the inner circumferential surface of first tubular portion 44. Stopper 45 restricts the circumferential movement of internal gear 60 of planetary gear-train section 70 relative to housing 30.

Stopper 45 is formed so as to extend in the axial direction (in the direction from a first side toward a second side in the axial direction). Multiple stoppers 45 are formed at predetermined intervals in the circumferential direction. For example, as illustrated in FIG. 11, multiple stoppers 45 are formed equidistantly.

Stopper 45 engages recess 65 formed in internal gear 60 of planetary gear-train section 70, thereby restricting the movement of internal gear 60 in the circumferential direction.

Stopper 45 also engages notch 55 of housing cover 50. Stopper 45 engages notch 55 and thereby guides housing cover 50 when housing cover 50 is attached to housing body 40.

When a cross section of stopper 45 is taken so as to orthogonally intersect the axial direction, the cross section has a circular tip end, and the size and shape of the cross section is unvarying in the axial direction. Stopper 45 is formed so as to be continuous to step portion 46 in the axial direction of first accommodation section 41.

For example, as illustrated in FIG. 11, six stoppers 45 are formed equidistantly on the inner circumferential surface of first tubular portion 44. The shape of stopper 45 is not limited to the above. Stopper 45 may be shaped differently insofar as stopper 45 is configured to engage recess 65 and notch 55.

Step portion 46 is formed at the inner circumferential surface of first tubular portion 44 so as to reduce the inside diameter of first tubular portion 44 relative to the portion of the inner circumferential surface on which stopper 45 is formed. The output-side end of gear body 61 of internal gear 60 is inserted so as to pass through annular step portion 46, and in this state, step portion 46 opposes output-side surface 632 of flange 63. In this state, flange 63 is interposed between step portion 46 and one end of housing cover 50. The one end of housing cover 50 is, for example, opening edge portion 512 of tubular insertion portion 51. Flange 63 is positioned so as to be spaced from step portion 46 and also from opening edge portion 512 in the axial direction.

Step portion 46 and opening edge portion 512 restrict the movement of flange 63 when flange 63 moves in the axial direction. Step portion 46 comes into contact with output-side surface 632 (more specifically, contact projection 67) of flange 63.

Step portion 46 opposes output-side surface 632 of flange 63 and can prevent flange 63 from moving toward the output side, thereby restricting the movement of the internal gear 60 toward the output side, or a second side, in the axial direction. Step portion 46 comes into contact with internal gear 60 so as to have a minimum contact area therebetween. More specifically, contact projection (i.e., contact portion) 67 of internal gear 60 comes into contact with the surface of step portion 46, the surface orthogonally intersecting the axial direction. Contact projection 67 is configured to come into point contact or line contact with the surface of step portion 46.

For example, as illustrated in FIGS. 3 and 6, second accommodation section 42 of housing body 40 includes second tubular portion 48. Second tubular portion 48 is continuous to first tubular portion 44 and has internal-gear teeth 47 formed on the inner surface thereof.

For example, internal-gear teeth 47 are formed so as to incline relative to the axial direction. For example, second accommodation section 42 having internal-gear teeth 47 forms a helical gear.

As illustrated in FIGS. 4 and 5, output-shaft connection portion 87 of planetary gear-train section 70 passes through tubular portion 43 of housing body 40 and is exposed to the outside. Output-shaft connection portion 87 is connected to an output shaft (not illustrated) so as to align the same axis and thereby transmits torque to an outside mechanism. For example, housing body 40 is made of synthetic resin and is formed by injection molding.

As a matter of convenience, an open side of housing body 40 to which housing cover 50 is inserted, as illustrated in FIGS. 1 to 4 and 6, is referred to as "first side" (i.e., the side facing the negative side on the x-axis) in the present specification. The opposite side of housing body 40, which has tubular portion 43, is referred to as "second side" (i.e., the side facing the positive side on the x-axis). In the present invention, however, the definitions of the first side and the second side are not limited to the above. The first side may refer to the side of housing body 40 having tubular portion 43 with an opening formed therein, and the second side may refer to the opening side of housing body 40 to which housing cover 50 is inserted.

(Housing Cover 50)

For example, housing cover 50 is a member configured to connect motor 10 to planetary gear device 20. In addition, housing cover 50 is attached to housing body 40 to form an accommodation space for planetary gear-train section 70. Housing cover 50 and housing body 40 movably hold internal gear 60 of planetary gear-train section 70 and support planetary gear-train section 70 in a suspended manner.

As illustrated in FIGS. 2 to 5, opening 50a is formed at the center of housing cover 50, and shaft 12 of motor 10 (see FIG. 1) is inserted through opening 50a. Shaft 12 inserted through opening 50a is fixed or connected to sun gear 811 (as indicated by imaginary lines) of planetary gear-train section 70, which will be described later. The driving force of motor 10 is transmitted to planetary gear device 20 via sun gear 811. For example, housing cover 50 is made of synthetic resin and is formed by injection molding.

Housing cover 50 is shaped like a closed-end pipe, and opening 50a is formed at the center of bottom portion 53. Housing cover 50 has fixation protrusions 57 at the rear surface thereof, which is the surface near the first side. Fixation protrusions 57 are fitted in respective fixation holes 112a and 112b of motor 10. Tubular insertion portion 51 is formed at the periphery of bottom portion 53 so as to project from the surface of housing cover 50 facing the second side (i.e., front surface).

Tubular insertion portion 51, which has notch 55 formed therein, also has engaging hook (i.e., engaging portion) 54 formed on the outer circumferential surface thereof. Engaging hook 54 engages engagement hole 442 (i.e., counterpart portion for engagement) of housing body 40, thereby fixing tubular insertion portion 51 to housing body 40. Tubular insertion portion 51 is formed so as to be fitted in housing body 40.

Tubular insertion portion 51 has opening edge portion 512 that opposes, in the axial direction, flange 63 of internal gear 60 of planetary gear-train section 70 accommodated in housing body 40. Opening edge portion 512, which opposes step portion 46 in the axial direction, is preferably shaped so as to have substantially the same area (for example, substantially the same size) as that of step portion 46.

The length of tubular insertion portion 51 in the axial direction (in the X direction) is such that opening edge portion 512 can come close to flange 63 of internal gear 60. Tubular insertion portion 51 is positioned such that flange 63 is interposed closely between tubular insertion portion 51 and step portion 46. When internal gear 60 moves in the axial direction, tubular insertion portion 51 comes into contact with internal gear 60, thereby restricting the further movement of internal gear 60.

The bottom of tubular insertion portion 51, which is bottom portion 53, has central projection 58 that projects frontward and through which opening 50a is formed. Central projection 58 comes into slidable contact with a surface of planetary gear-train section 70, the surface facing the first side in the axial direction.

Annular positioning portion 534 is formed inside tubular insertion portion 51. Annular positioning portion 534 is formed so as to oppose a first end of first gear train 81, the first end facing the first side in the axial direction. More specifically, annular positioning portion 534 is formed so as to oppose a first end surface of carrier 813, the first end surface facing the input side. Annular positioning portion 534 comes into contact with the end of carrier 813, the end facing the first side (input side), so as to enable carrier 813 to slide against annular positioning portion 534 about the central axis of planetary gear device 20.

Housing cover 50 has flanges 56 formed on the periphery of bottom portion 53 at predetermined intervals. Flanges 56 engage respective notches 444 that are formed like recesses at the opening edge portion of housing body 40. Housing cover 50 thereby closes the opening of housing body 40 with shaft 12 (see FIG. 1) being inserted through housing cover 50.

For example, planetary gear-train section 70 includes internal gear 60, first gear train 81, second gear train 82, and output-shaft connection portion 87, which are disposed so as to align the axial direction, as illustrated in FIGS. 3 to 5. Planetary gear-train section 70 inputs rotation from motor 10, reduces the speed of rotation in two stages using first gear train 81 and second gear train 82, and outputs rotation from output-shaft connection portion 87.

As illustrated in FIGS. 3 and 5, first gear train 81 is disposed inside internal gear 60. First gear train 81 includes sun gear 811 (see FIG. 3), three or multiple planetary gears 812 disposed around sun gear 811, and carrier 813 configured to rotatably support planetary gears 812. Note that although only two planetary gears 812 can be seen in the perspective view of FIG. 5, one more planetary gear 812 is present at a deep position behind carrier 813. Details of internal gear 60 will be described later.

Sun gear 811 is an external gear with sun-gear teeth being formed on the outer circumferential surface thereof. Shaft 12 of motor 10 illustrated in FIG. 1 is fixed to, or connected to, sun gear 811. Accordingly, when motor 10 is driven, sun gear 811 rotates. For example, the sun-gear teeth are helical teeth formed obliquely relative to the axis of sun gear 811. Accordingly, sun gear 811 is a helical gear.

Planetary gear 812 is an external gear having planet-gear teeth formed on the outer circumferential surface. For example, the planet-gear teeth are helical teeth formed obliquely relative to the axis of planetary gear 812. Accordingly, planetary gear 812 is a helical gear. Three planetary gears 812 are disposed equidistantly on an imaginary circle of which the center is positioned at the axis of internal gear 60 and first gear train 81. Sun gear 811 is positioned at the center of three planetary gears 812 and the sun-gear teeth mesh with the planet-gear teeth of respective three planetary gears 812.

For example, carrier 813 is shaped cylindrically. Carrier 813 has three accommodation openings 813a formed on the outer circumferential surface thereof for accommodating respective planetary gears 812. As illustrated in FIG. 3, each planetary gear 812 is rotatably supported inside accommodation opening 813a by pin 816 that extends in the axial direction. For example, planetary gear 812 is supported such that a portion of the planet-gear teeth protrudes out of the outer circumferential surface of carrier 813. Accordingly, the planet-gear teeth can mesh with internal-gear teeth 62 of internal gear 60, which will be described later.

For example, as illustrated in FIGS. 3 and 5, second gear train 82 includes sun gear 821, three planetary gears 822, carrier 823, and output-shaft connection portion 87. Carrier 823 supports three planetary gears 822 rotatably. Note that although only two planetary gears 822 can be seen in the perspective view of FIG. 5, one more planetary gear 822 is present at a deep position behind carrier 823.

For example, sun gear 821 is an external gear having sun-gear teeth formed on the outer circumferential surface thereof. As illustrated in FIGS. 3 and 5, sun gear 821 is fixed to (or connected to) carrier 813 of first gear train 81 with the axis of sun gear 821 aligning with the axes of carrier 813 and internal gear 60. Sun gear 821 rotates together with, or in synchronization with, the rotation of internal gear 60 and carrier 813. More specifically, the rotation of internal gear 60 and carrier 813 of first gear train 81 causes sun gear 821 to rotate in the same direction and at the same speed. For example, sun gear 821 has helical teeth formed obliquely relative to the axis of sun gear 821. Accordingly, sun gear 821 is a helical gear.

For example, planetary gear 822 is an external gear having planet-gear teeth formed on the outer circumferential surface. For example, the planet-gear teeth are helical teeth formed obliquely relative to the axis of planetary gear 822. Accordingly, planetary gear 822 is a helical gear. For example, three planetary gears 822 are disposed equidistantly on an imaginary circle of which the center is positioned at the axis of second gear train 82. Sun gear 821 is positioned at the center of three planetary gears 822 and the sun-gear teeth mesh with the planet-gear teeth of respective three planetary gears 822. In addition, planetary gears 822 mesh with internal-gear teeth 47 formed in the housing body 40 illustrated in FIGS. 3 and 6.

For example, carrier 823 includes gear-retention portion 824 and output-shaft connection portion 87. Gear-retention portion 824 holds planetary gears 822. For example, gear-retention portion 824 is shaped cylindrically. Gear-retention portion 824 has three accommodation openings 823a formed at the outer circumferential surface thereof for accommodating respective planetary gears 822. As illustrated in FIG. 5, each planetary gear 822 is rotatably supported inside accommodation opening 823a by pin 826 that extends in the axial direction.

Planetary gear 822 is supported such that a portion of the planet-gear teeth protrudes out of the outer circumferential surface of carrier 823. Accordingly, the planet-gear teeth can mesh with internal-gear teeth 47 formed in second accommodation section 42 of housing body 40. Output-shaft connection portion 87 has an engagement hole for holding the output shaft, the engagement hole being formed through the central portion.

(Internal Gear 60)

As illustrated in FIGS. 3, 5, and 7, internal gear 60 includes gear body (tubular body) 61 formed annularly or cylindrically. Internal-gear teeth 62 are formed on the inner circumferential surface of gear body 61. Internal-gear teeth 62 are helical teeth formed obliquely relative to the axis of internal gear 60. Accordingly, internal gear 60 is a helical gear. The diameter of the addendum circle of internal gear 60 is greater than the diameter of cylindrically shaped carrier 813. Carrier 813 holding planetary gears 812 therein is accommodated inside internal gear 60. The planet-gear teeth protruding out of the outer circumferential surface of carrier 813 mesh with internal-gear teeth 62 of internal gear 60.

Flange 63 is formed continuously on outer circumferential surface 610 of gear body 61 (see FIG. 11) so as to extend in the circumferential direction and to project outward in the radial direction.

Gear body 61 has a first side portion positioned closer to the first side from flange 63 and a second side portion positioned closer to the second side from flange 63. The first side portion of gear body 61 engages housing cover 50, and the second side portion engages housing body 40 (more specifically, engages first accommodation section 41 having step portion 46).

In gear body 61, flange 63 is shaped so as to extend in the circumferential direction and project outward in the radial direction. The portion of flange 63 raised from outer circumferential surface 610 is continuous around gear body 61.

Flange 63 is formed at the center, in the axial direction, of the outer circumferential surface of the gear body 61. Flange 63 has opposite surfaces facing oppositely in the axial direction, and contact projections 67 are formed on both of the opposite surfaces so as to come into contact with opening edge portion 512 of housing cover 50 and with step portion 46 of housing body 40, respectively.

Flange 63, which extends continuously around the gear body 61 and projects from the outer circumferential surface, has a top end surface. Recess 65 is formed at the top end surface of flange 63 so as to be able to engage stopper 45 of housing body 40 loosely so that flange 63 can move slightly in the circumferential direction.

Recess 65 is a groove formed at the top end surface of flange 63. Opposite ends of the groove in the axial direction are open. More specifically, recess 65 is formed in flange 63 that projects radially outward from outer circumferential surface 610 of gear body 61, and the bottom (bottom surface) of recess 65 is positioned radially outward from outer circumferential surface 610 of gear body 61. In other words, recess 65 is formed into a mid-portion of flange 63, the mid-portion being positioned away from outer circumferential surface 610 of gear body 61. For example, multiple recesses 65 are formed discretely and equidistantly around outer circumferential surface 610. Even though multiple recesses 65 are formed, flange 63 is continuous in the circumferential direction and still has a projected portion around gear body 61.

Stopper 45 is configured to come into recess 65 so as to be movable in the circumferential direction. When internal gear 60 moves in the circumferential direction, recess 65 engages stopper 45 in the circumferential direction. This restricts further movement of flange 63 of internal gear 60 in the circumferential direction. In this state, internal gear 60 is accommodated in housing body 40. Recess 65 is formed in flange 63 so as to extend in the axial direction between the opposite surfaces of flange 63 (between the input-side surface and the output-side surface of flange 63). This makes it easier to position stopper 45 in recess 65 when internal gear 60 is inserted into housing body 40 in the axial direction.

Flange 63, which is formed around the gear body 61 so as to project radially, functions as a rib or a member for reinforcing gear body 61 when a radial load is applied to gear body 61 of cylindrically shaped internal gear 60. This prevents gear body 61 from deforming even if a radial load is applied to gear body 61 (for example, applied from outside).

Multiple contact projections 67 are preferably disposed circumferentially in such a manner that when internal gear 60 moves inside housing 30 in the axial direction, contact projections 67 come into planar contact with opening edge portion 512 or step portion 46 on a plane that orthogonally intersects the axial direction. Contact projections 67 are provided equidistantly in the circumferential direction so as to protrude from the opposite surfaces of flange 63. Each contact projection 67 is shaped such that when a cross section of contact projection 67 is taken so as to orthogonally intersect the axial direction, the area of the cross section decreases gradually as the cross section comes closer to the tip end of contact projection 67.

Contact projection 67 is shaped as a projection having an arcuate cross section, but the shape of contact projection 67 is not limited to this. Contact projection 67 may be shaped such that contact projection 67 protrudes in the axial direction and can come into contact with opening edge portion 512 or step portion 46 with the contact area being as small as possible. Contact projections 67 may be formed on step portion 46 or opening edge portion 512 that flange 63 opposes instead of disposing contact projections 67 on the input-side surface and the output-side surface (output-side surface 632) of flange 63.

Gear body 61 (planetary gear-train section 70) is accommodated in housing body 40 (in first accommodation section 41) so as to be movable within a controlled range in the circumferential direction and in the axial direction (in other words, accommodated in a suspended manner).

Internal gear 60 is supported in a suspended manner inside housing 30 with minimum contact points with housing 30 in the circumferential and axial directions. The driving force transmitted from motor 10 brings internal gear 60 into minimal areal contact with housing 30, thereby restricting further movement of internal gear 60. In this state, internal gear 60 transmits the driving force.

In internal gear 60, flange 63 that comes into contact with housing 30 is formed around tubular gear body 61 at the center in the axial direction. Internal gear 60 is thereby supported balancedly inside housing 30.

Internal gear 60 can reduce the occurrence of contraction when internal gear 60 is molded from resin or the like and subsequently removed from the mold. In other words, internal gear 60 can be manufactured with a high accuracy.

Embodiment 2

Figure 13:
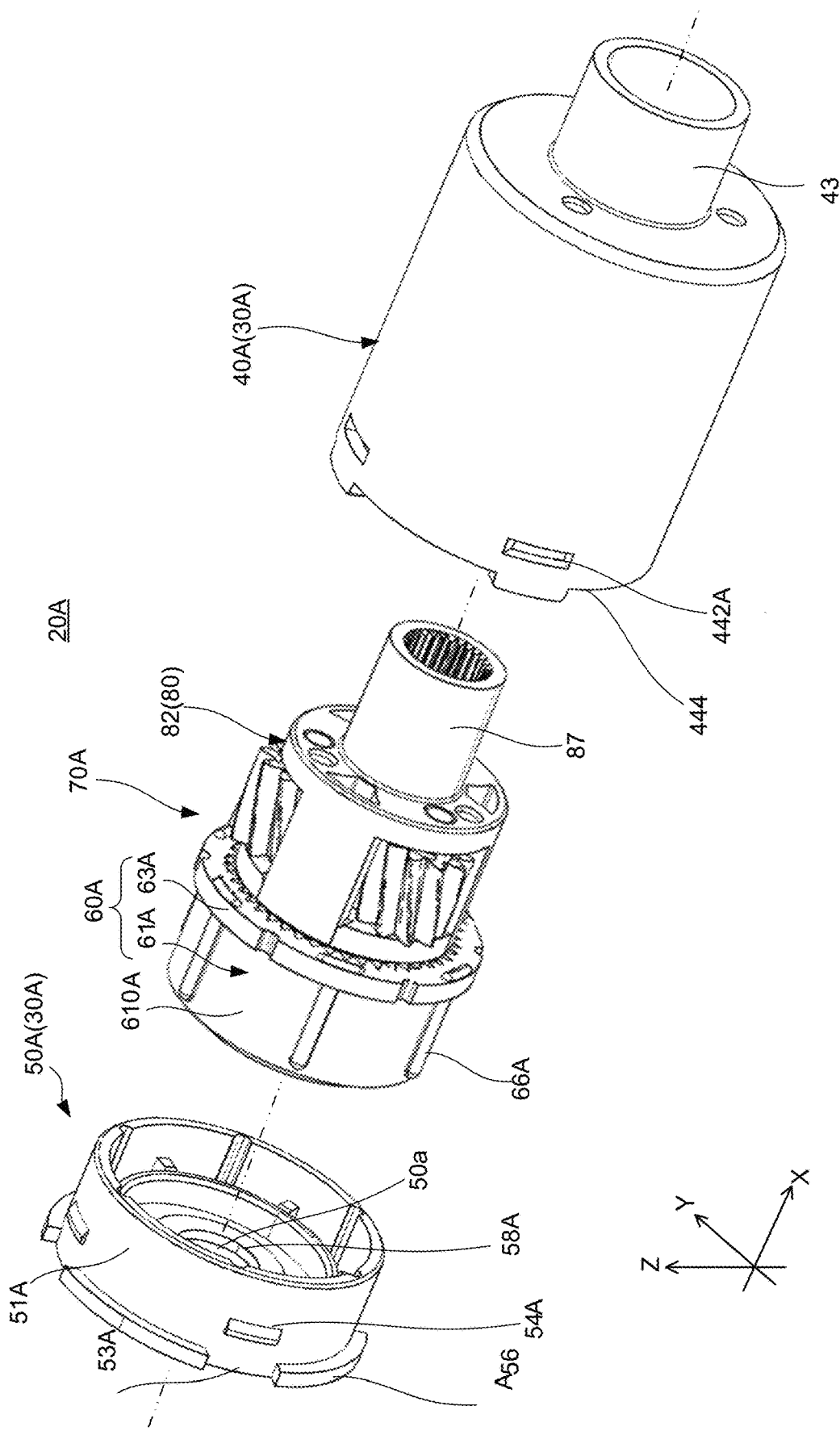
FIG. 13 is an exploded view illustrating a planetary gear device according to Embodiment 2 of the present invention.
Figure 14:
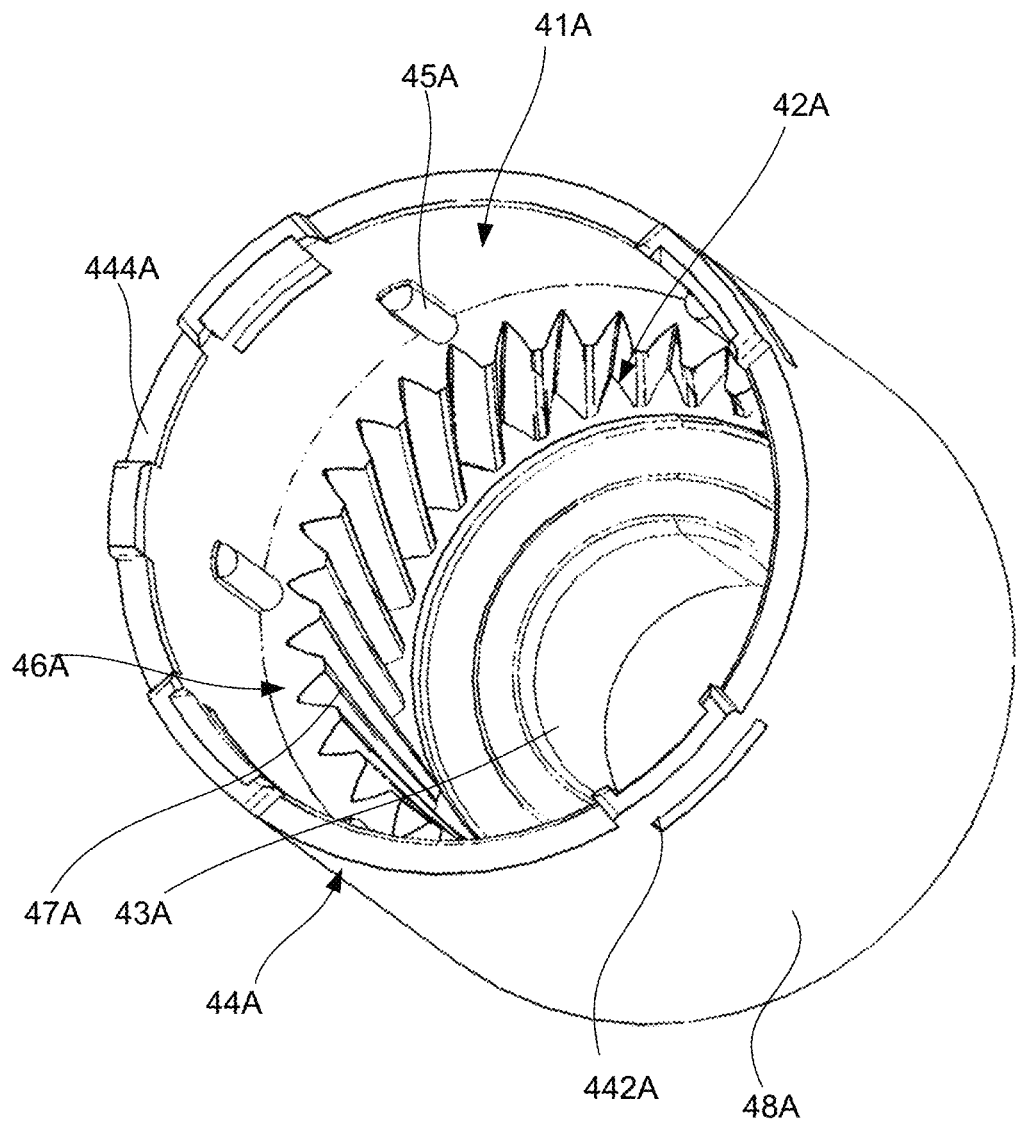
FIG. 14 is a perspective rear view illustrating a housing.
Figure 14:
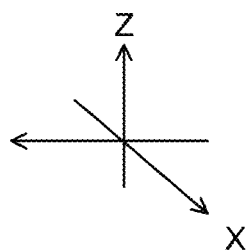

FIG. 13 is an exploded view illustrating a planetary gear device according to Embodiment 2 of the present invention. FIG. 14 is a perspective rear view of a housing, and FIG. 15 is an enlarged perspective view illustrating an internal gear and a housing cover.

Figure 15:
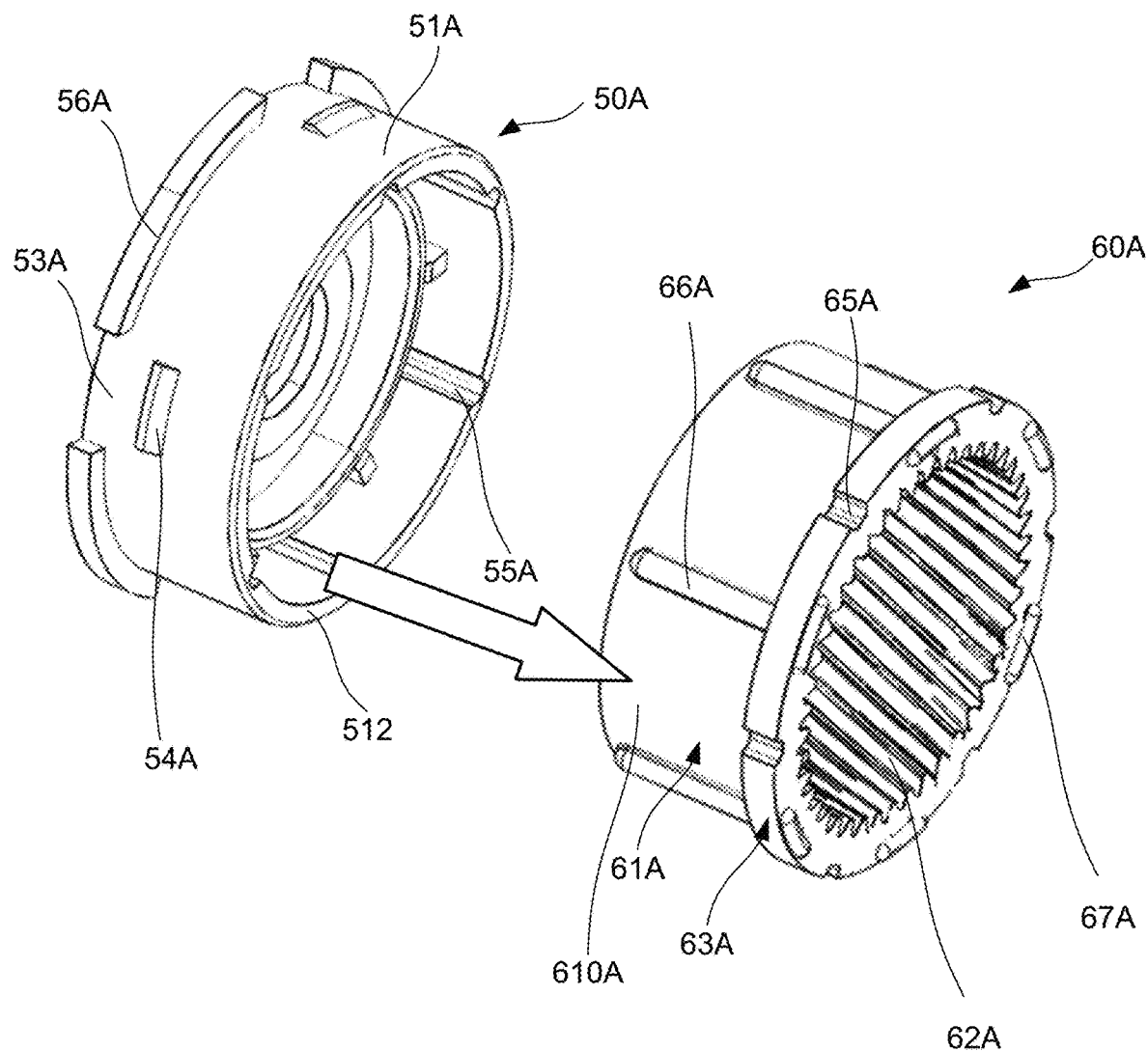
FIG. 15 is an enlarged perspective view illustrating an internal gear and a housing cover.

The planetary gear device illustrated in FIGS. 13 to 15 has a basic structure similar to that of planetary gear device 20 of the actuator according to Embodiment 1 illustrated in FIG. 1. In the present embodiment, the same elements as those described in Embodiment 1 are denoted by the same reference signs and duplicated descriptions will be omitted.

Planetary gear device 20A illustrated in FIG. 13 includes housing 30A and planetary gear-train section 70A accommodated in housing 30A. Housing 30A includes housing body 40A and housing cover 50A.

The structure and functions of planetary gear device 20A are the same as those of planetary gear device 20 except for the position of flange 63A of internal gear 60A of planetary gear device 20A.

Compared with planetary gear device 20, planetary gear device 20A has a different separation structure that includes internal gear 60A and housing 30A (including housing body 40A and housing cover 50A). On the other hand, gear unit 80 accommodated in the separation structure of Embodiment 2 is similar to that of Embodiment 1.

Tubularly shaped housing body 40A has an opening at the first-side end in the axial direction, and housing cover 50A is attached to the first-side end of housing body 40A so as to close the opening, thereby forming housing 30A. Housing 30A accommodates planetary gear-train section 70A. In the planetary gear-train section 70A, internal gear 60A is disposed around first gear train 81 of gear unit 80, and planetary gears 812 mesh with internal-gear teeth 62A formed on the inner circumferential surface of internal gear 60A.

In planetary gear device 20A, housing body 40A is physically separated from internal gear 60A. Accordingly, when the actuator is not in operation, a gap is formed between housing body 40A and internal gear 60A. Accordingly, internal gear 60A is held inside housing body 40A in a suspended manner. Inside housing body 40A, internal gear 60A can move in the axial direction and in the direction orthogonal to the axial direction and can rotate in the circumferential direction to the extent allowed by the gap between internal gear 60A and housing body 40A.

Shaft 12 of motor 10 is connected to first gear train 81 of gear unit 80, which is a high-speed gear train. Gear unit 80 is suspended in housing 30A using first gear train 81 and internal gear 60A so as to minimize the number of contact points between gear unit 80 and housing 30A.

Figure 16:
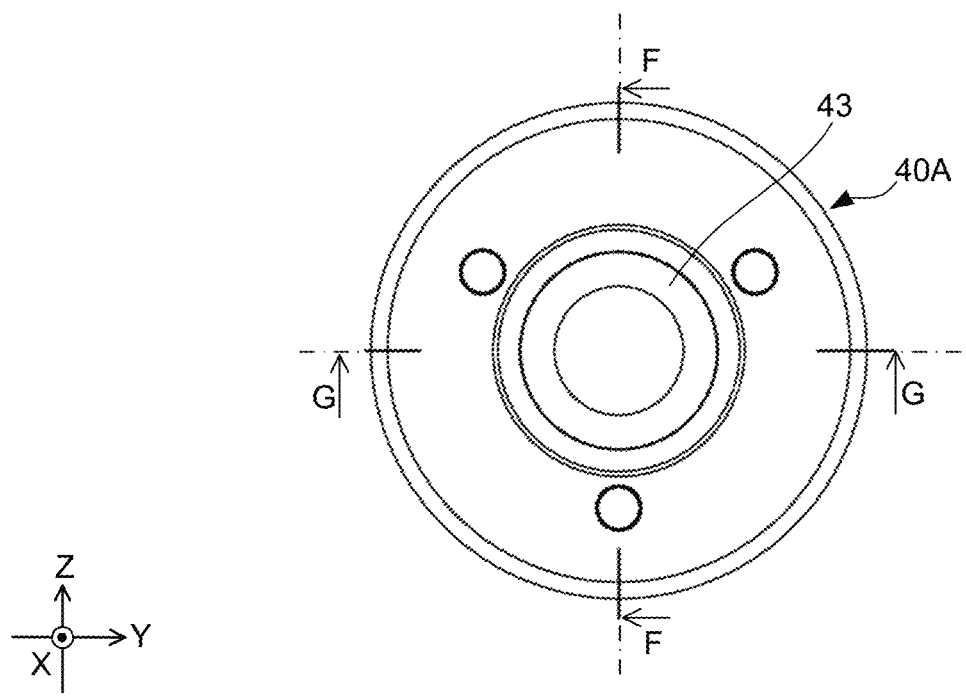
FIG. 16 is a front view illustrating a separation structure.
Figure 17:
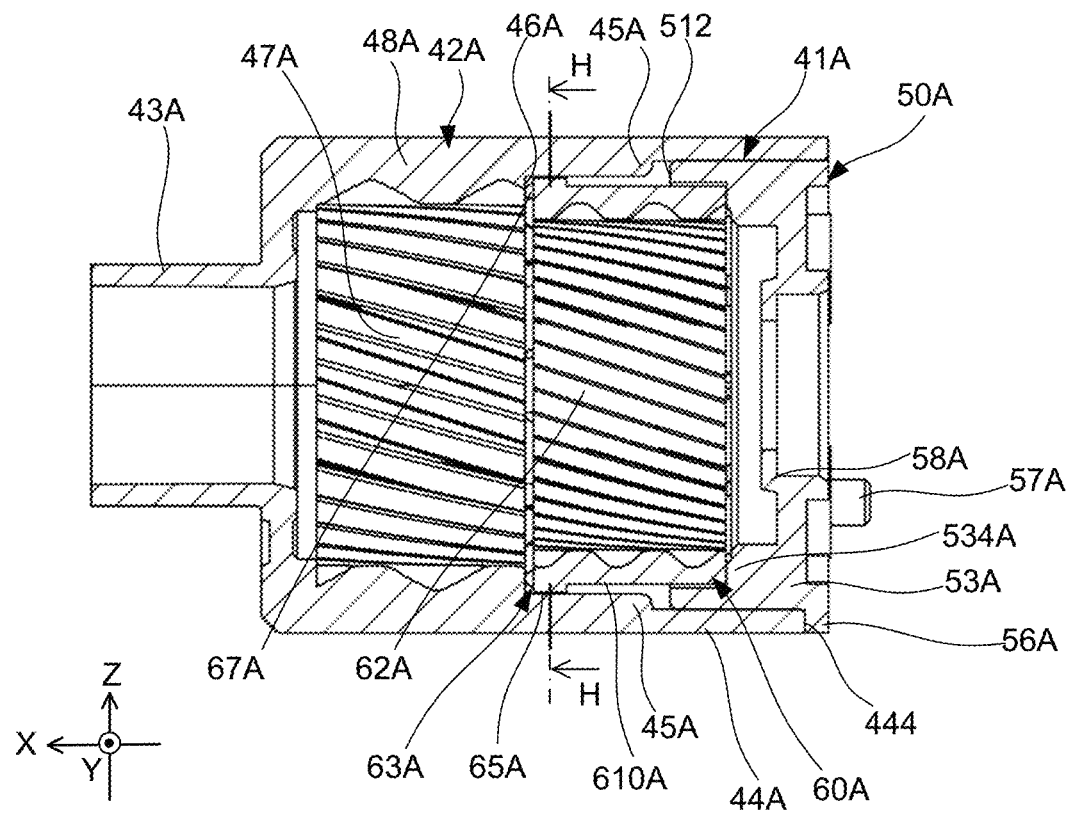
FIG. 17 is a cross-sectional view taken along line F-F in FIG. 16.
Figure 18:
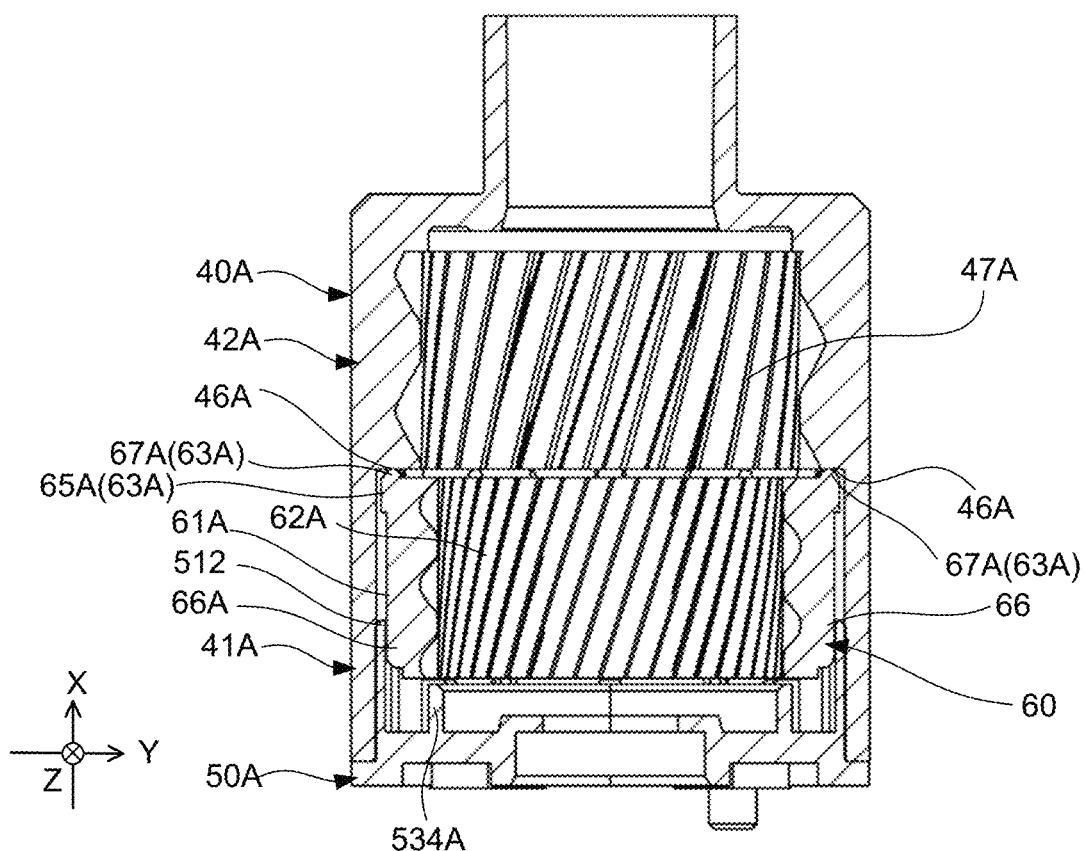
FIG. 18 is a cross-sectional view taken along line G-G in FIG. 16.
Figure 19:
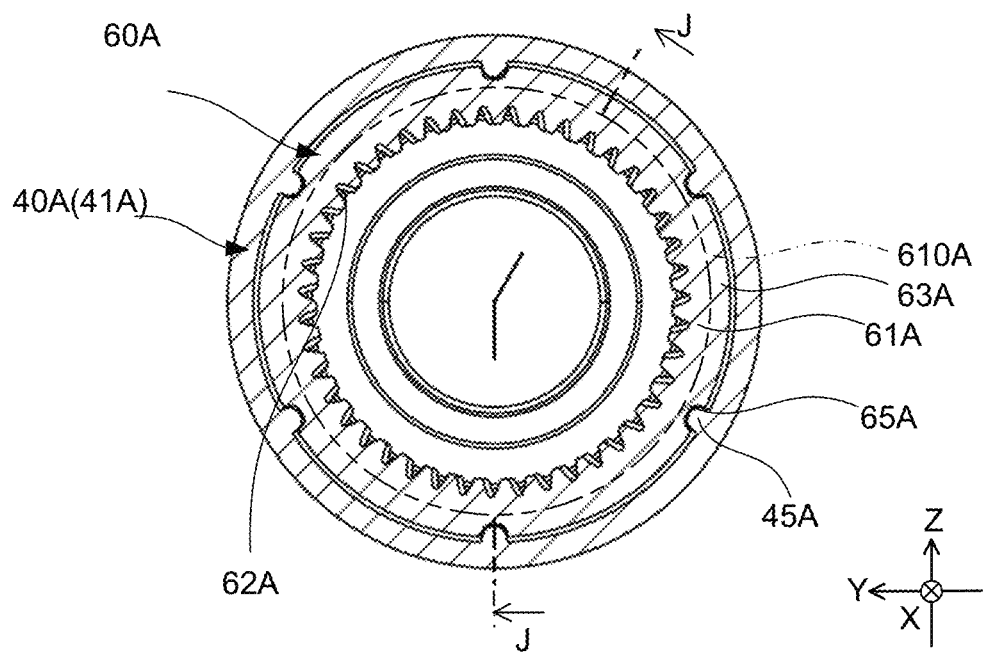
FIG. 19 is a cross-sectional view taken along line H-H in FIG. 17.
Figure 20:
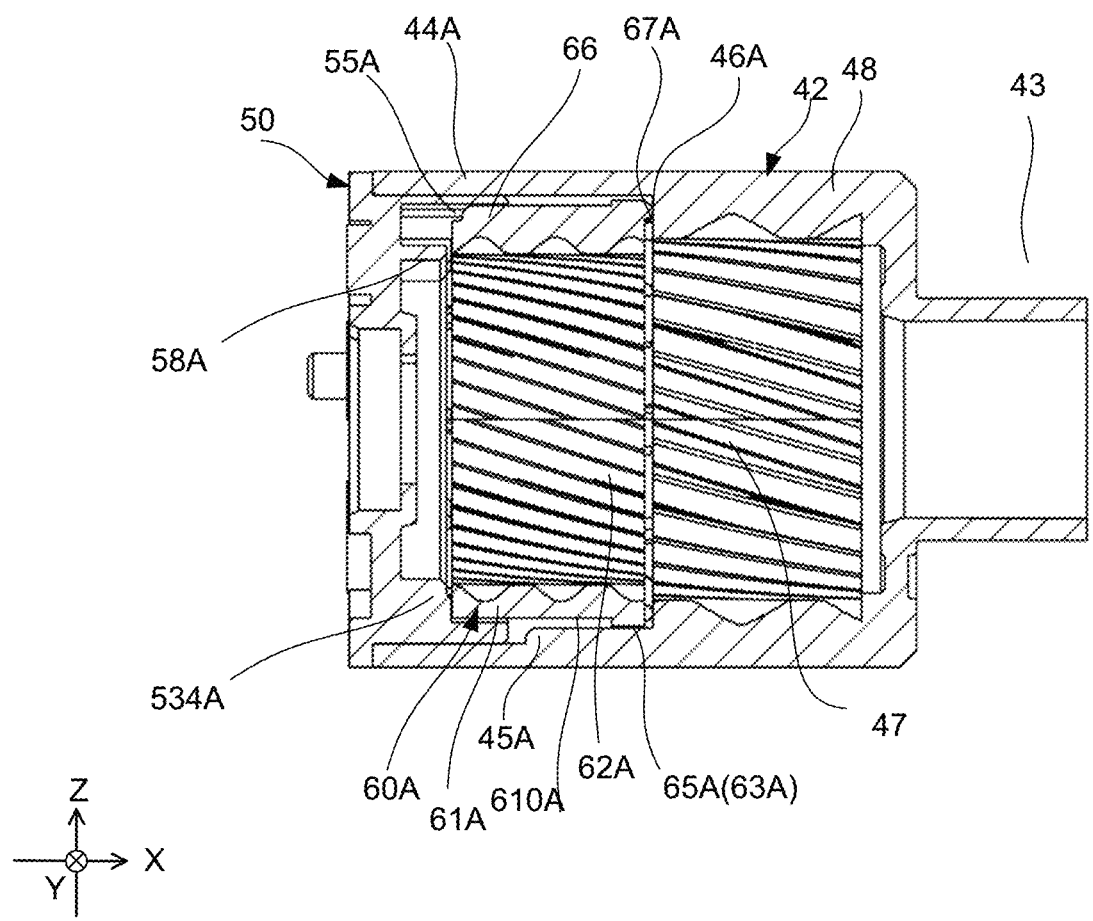
FIG. 20 is a cross-sectional view taken along line J-J in FIG. 19.

FIG. 16 is a front view of the separation structure. FIG. 17 is a cross section taken along line F-F in FIG. 16, and FIG. 18 is a cross section taken along line G-G in FIG. 16. FIG. 19 is a cross section taken along line H-H in FIG. 17, and FIG. 20 is a cross section taken along line J-J in FIG. 19.

(Housing Body 40A)

As illustrated in FIGS. 13 and 14, housing body 40A has a similar structure as that of housing body 40 so that housing body 40A and housing body 40 can function in a similar manner. A side of housing body 40A (i.e., first side) is an open side to which housing cover 50A is attached. Planetary gear-train section 70A illustrated in FIGS. 13 and 15 is put into housing body 40A from this opening.

Housing body 40A includes first accommodation section 41A and second accommodation section 42A, both of which are shaped tubularly. First accommodation section 41A accommodates internal gear 60A and first gear train 81. Second accommodation section 42A is continuous to the output side of first accommodation section 41A in the axial direction and accommodates second gear train 82. Tubular portion 43 is formed so as to be continuous to second accommodation section 42A.

As illustrated in FIG. 14, first accommodation section 41A includes cylindrically shaped first tubular portion 44A, stopper (projection) 45A, and step portion 46A.

Housing cover 50A has tubular insertion portion 51A, and tubular insertion portion 51A is inserted in, and thereby closes, the opening of first tubular portion 44A.

Stopper 45A and step portion 46A are formed at the inner circumferential surface of first tubular portion 44A. Stopper 45A and step portion 46A function similarly to stopper 45 and step portion 46. However, stopper 45A has a different axial length, and step portion 46A is positioned differently in the axial direction.

Stopper 45A is formed so as to extend in the axial direction (in the direction from the first side toward the second side in the axial direction). Stopper 45A extends from the end of first accommodation section 41A facing the second side to a point near the center, in other words, to a point near the region in which tubular insertion portion 51A of housing cover 50A is inserted. Multiple stoppers 45A are positioned so as to be adjacent to inserted tubular insertion portion 51A in the axial direction and are arranged in the circumferential direction at predetermined intervals.

Stopper 45A is configured to come into recess 65A of internal gear 60A of planetary gear-train section 70A. When internal gear 60A moves in the circumferential direction, stopper 45A engages recess 65A and thereby restricts further movement of internal gear 60A. Thus, stopper 45A restricts the circumferential movement of planetary gear-train section 70A (internal gear 60A) relative to housing 30A in which planetary gear-train section 70A (internal gear 60A) is accommodated. As illustrated in FIG. 19, multiple stoppers 45A and multiple recesses 65A are formed equidistantly.

Step portion 46A has a side surface of internal-gear teeth 47A in second accommodation section 42A, the side surface facing the first side. Stopper 45A is formed so as to extend from step portion 46A. Step portion 46A opposes flange 63A of internal gear 60A and is positioned so as to come into contact with flange 63A when internal gear 60A moves.

Step portion 46A comes into contact with output-side surface 632 of flange 63A and prevents internal gear 60A from moving toward the second side (toward the output side) in the axial direction. Flange 63A is formed at the output-side end of internal gear 60A. Step portion 46A prevents internal gear 60A from moving toward the output side. Contact projection 67A formed at flange 63A is configured to come into contact or into line contact with the surface of step portion 46A, the surface orthogonally intersecting the axial direction. Accordingly, step portion 46A comes into contact with internal gear 60A so as to have a minimum contact area therebetween.

Second accommodation section 42A of housing body 40A includes second tubular portion 48A. Second tubular portion 48A is continuous to first tubular portion 44A and has internal-gear teeth 47A formed on the inner circumferential surface thereof. Second accommodation section 42A and second accommodation section 42 are structured similarly and have similar functions. Detailed description of second accommodation section 42A is omitted.

(Housing Cover 50A)

Housing cover 50A is structured similarly to housing cover 50 and configured to connect motor 10 to planetary gear device 20A. Housing cover 50A is attached to housing body 40A to form an accommodation space for planetary gear-train section 70A. Elements of housing cover 50A that are similar in structure and function to those of housing cover 50 are denoted by the same reference signs with the same names, and duplicated descriptions are omitted.

Housing cover 50A is different from housing cover 50 in that housing cover 50A holds internal gear 60A without coming into contact with flange 63A when housing cover 50A movably holds planetary gear-train section 70A in the axial direction.

Housing cover 50A has central projection 58A that is formed at the center of bottom portion 53A so as to project therefrom. Central projection 58A comes into slidable contact with a first end of planetary gear-train section 70A, the first end facing the input side. Central projection 58A movably supports internal gear 60A in collaboration with step portion 46A of housing body 40A and simultaneously prevents internal gear 60A from moving in the axial direction. Central projection 58A supports internal gear 60A and accordingly supports planetary gear-train section 70A in a suspended manner.

Housing cover 50A is shaped like a closed-end pipe and includes bottom portion 53A configured to close the opening of housing body 40A. Housing cover 50A also includes tubular insertion portion 51A projecting at the periphery of bottom portion 53A. Annular positioning portion 534A of bottom portion 53A loosely holds the first end (input-side end) of planetary gear-train section 70A and movably supports planetary gear-train section 70A.

Grooves 55A are formed on the inner circumferential surface of tubular insertion portion 51A. Grooves 55A extend in the axial direction and are arranged at predetermined intervals in the circumferential direction. Grooves 55A are configured to engage respective guide protrusions 66A of internal gear 60A, thereby enabling appropriate engagement of housing cover 50A and housing body 40A.

As does housing cover 50, housing cover 50A has fixation protrusion 57A for the connection with motor 10, engaging hook (engaging portion) 54A, and flange 56A. Housing cover 50A is fixed to housing body 40A with engaging hook 54A engaging engagement hole 442A (i.e., counterpart portion for engagement) of housing body 40A.

Grooves 55A of tubular insertion portion 51A of housing body 40A are fitted onto respective guide protrusions 66A of internal gear 60A, and recesses 65A of internal gear 60A are fitted onto respective stoppers 45A of housing body 40A. Housing cover 50A is thereby fixed to housing body 40A so as to enable internal gear 60A to move in a predetermined range, in other words, in a suspended state.

(Internal Gear 60A)

As illustrated in FIGS. 13, 15, and 17 to 20, internal gear 60A includes annularly (cylindrically) shaped gear body 61A and flange 63A. Internal-gear teeth 62A, which are similar to internal-gear teeth 62, are formed on the inner circumferential surface of gear body 61A of internal gear 60A. The diameter of addendum circle of internal gear 60A is greater than the diameter of cylindrically shaped carrier 813. Carrier 813, which holds planetary gears 812 therein, is accommodated in internal gear 60A. The planet-gear teeth protruding out of the outer circumferential surface of carrier 813 mesh with internal-gear teeth 62A of internal gear 60A.

Flange 63A is formed continuously on the outer circumferential surface of gear body 61A at a second end (i.e., the end facing the output side) so as to extend circumferentially and project outward in the radial direction. Flange 63A has a portion raised from outer circumferential surface 610A, and the portion is continuous entirely around gear body 61A.

Gear body 61A is accommodated in first accommodation section 41A of housing body 40A so as to be movable within a controlled range in the circumferential direction and in the axial direction.

First gear train 81 of gear unit 80 is disposed inside gear body 61A. Gear body 61A is disposed inside first accommodation section 41A. Flange 63A is formed at an end of gear body 61A, the end facing the output side (i.e., facing second accommodation section 42A) in the axial direction. Flange 63A opposes step portion 46A. In addition, an end of gear body 61A facing the input side (the end near the first side) engages housing cover 50A (i.e., annular positioning portion 534A) so as to be able to come into contact with central projection 58A.

Flange 63A, which projects radially outward, has a top end surface. Recess 65A is formed at the top end surface of flange 63A so as to be able to engage stopper 45A of housing body 40A loosely so that flange 63A can move slightly in the circumferential direction. Recess 65A has a shape similar to that of recess 65 and functions similarly. The bottom of recess 65A is positioned radially outward from outer circumferential surface 610A of gear body 61A. Recess 65A is a groove formed at the top end surface of flange 63A, and opposite ends of the groove in the axial direction are open. The groove receives stopper 45A so as to allow slight circumferential movement relative to each other.

Internal gear 60A is accommodated in housing body 40A in such a manner that further circumferential movement of internal gear 60A is restricted by flange 63A. Engagement of recess 65A and stopper 45A restricts the circumferential movement of flange 63A of internal gear 60A.

The bottom of recess 65A is positioned radially outward from outer circumferential surface 610A of gear body 61A. Flange 63A projects radially outward from outer circumferential surface 610A of gear body 61A, and recess 65A is formed in flange 63A at a position radially outward from outer circumferential surface 610A. Recess 65A is formed in flange 63A in a similar manner in which recess 65 is formed in flange 63. Recess 65A is formed in flange 63A so as to be positioned away from outer circumferential surface 610A. Flange 63A is shaped so as to extend in the circumferential direction entirely around gear body 61A and project outward in the radial direction. The flange 63A is continuous around gear body 61A. In cylindrically shaped internal gear 60A, flange 63A is raised from outer circumferential surface 610A of gear body 61A in directions orthogonal to the axial direction. Accordingly, flange 63A can function as a rib (reinforcement member) for reinforcing gear body 61A. This prevents gear body 61A from deforming even if a radial load is applied to gear body 61A (for example, applied from outside).

Flange 63A is formed at the first end of the gear body 61A on the outer circumferential surface 610A of gear body 61A. This can reduce the occurrence of deformation of gear body 61A of internal gear 60A due to contraction when internal gear 60A is, for example, produced by resin molding and subsequently removed from the mold. Accordingly, internal gear 60A can be manufactured with a high accuracy and with a small tolerance. The flange 63A has contact projection 67A formed on the surface opposing step portion 46A of housing body 40A. Contact projection 67A is configured to come into contact with step portion 46A in the axial direction.

Contact projection 67A is similar in structure and function to contact projection 67. Multiple contact projections 67A are disposed circumferentially in such a manner that contact projections 67A come into planar contact with step portion 46A on a plane orthogonal to the axial direction when internal gear 60A moves inside housing 30A in the axial direction.

Internal gear 60A is supported substantially at the same position axially and circumferentially without being fixed to housing 30A. The driving force transmitted from motor 10 brings internal gear 60A into minimal areal contact with housing 30A, thereby restricting further movement of internal gear 60A. In this state, internal gear 60A transmits the driving force. Planetary gear-train section 70A is accommodated in housing body 40A with gear body 61A being positioned inside the first accommodation section 41A. In this state, planetary gear-train section 70A is movable within a controlled range in the circumferential direction and in the axial direction.

(Operation of Planetary Gear Device 20)

Operation of planetary gear device having the separation structure as well as operation of actuator 1 will be described briefly.

Referring to FIG. 1, when motor 10 operates, shaft 12 rotates in a first direction or in a second direction. The following describes the operation in the case of shaft 12 rotating in the first direction. The first direction refers to the direction in which rotatable members in FIG. 1 rotate clockwise. The second direction refers to the direction in which the members rotate counterclockwise.

The rotation of shaft 12 in the first direction causes sun gear 811 of FIG. 3 to rotate in the first direction. The rotation of sun gear 811 in the first direction causes each of three planetary gears 812 meshing with sun gear 811 to rotate (i.e., axial rotation) in the second direction. Because planetary gears 812 mesh with internal gear 60, the rotation (i.e., axial rotation) of each planetary gear 812 in the second direction causes three planetary gears 812 to revolve (i.e., orbital revolution) in the first direction round the axis of internal gear 60 and first gear train 81. The revolution (i.e., orbital revolution) of three planetary gears 812 causes carrier 813 to rotate (i.e., axial rotation) in the first direction about the axis of the carrier 813.

Because sun gear 821 is fixed to carrier 813 as illustrated in FIG. 3, the rotation of carrier 813 in the first direction causes sun gear 821 to rotate in the first direction. The rotation of sun gear 821 in the first direction causes each of three planetary gears 822 meshing with sun gear 821 to rotate (i.e., axial rotation) in the second direction.

Because planetary gears 822 mesh with internal-gear teeth 47 as illustrated in FIGS. 3 and 5, the rotation (i.e., axial rotation) of each planetary gear 822 in the second direction causes three planetary gears 812 to revolve (i.e., orbital revolution) in the first direction round the axis of second gear train 82. The revolution (i.e., orbital revolution) of three planetary gears 822 causes carrier 823 to rotate (i.e., axial rotation) in the first direction about the axis of carrier 823. The rotation of carrier 823 that holds output-shaft connection portion 87 is transmitted to output shaft (not illustrated) that is coaxially fitted in output-shaft connection portion 87.

The above describes the operation of actuator 1 when shaft 12 rotates in the first direction. When shaft 12 rotates in the second direction, actuator 1 operates in a similar manner with each gear rotating in the direction opposite to the above.

Housing body 40 or 40A is physically separated from corresponding internal gear 60 or 60A. When actuator 1 is not in operation, a gap is formed between housing body 40 or 40A and internal gear 60 or 60A.

When actuator 1 operates, internal gear 60 or 60A is allowed to move in the circumferential direction or in a direction orthogonal to the axis in housing body 40 or 40A to the extent of the gap formed. For example, when internal gear 60 or 60A rotates in the first direction (clockwise), recesses 65 or 65A formed in flange 63 or 63A of internal gear 60 or 60A come into line or point contact with respective stoppers 45 or 45A of housing body 40 or 40A.

This prevents internal gear 60 or 60A from rotating further clockwise. Similarly, in the case of internal gear 60 or 60A rotating in the second direction (counterclockwise), recesses 65 or 65A come into line or point contact with respective stoppers 45 or 45A of housing body 40 or 40A, preventing internal gear 60 or 60A from rotating about the axis thereof.

In the case of internal gear 60 or 60A moving in the axial direction, the movement of internal gear 60 or 60A is prevented due to internal gear 60 or 60A coming into contact with step portion 46 or 46A or housing cover 50 or 50A. In this case, other portions of internal gear 60 or 60A, which are portions other than contact portions, are not in contact with housing 30 or 30A. Internal gear 60 or 60A accommodated in housing 30 or 30A transmits driving force appropriately while in minimal areal contact with housing 30 or 30A.

Advantageous Effects

According to the above embodiments, internal gear 60 or 60A has flange 63 or 63A formed on tubular gear body 61 or 61A so as to extend circumferentially around the outer circumferential surface thereof. In other words, flange 63 or 63A is formed such that the projected portion is continuous circumferentially on the outer circumferential surface 610 or 610A of gear body 61 or 61A.

Flange 63 or 63A and recesses 65 or 65A and contact projections 67 or 67A formed on flange 63 or 63A serve as contact portions to come into contact with housing 30 or 30A (housing body 40 or 40A).

Flange 63 or 63A extends continuously in the circumferential direction along gear body 61 or 61A of internal gear 60 or 60A. Accordingly, flange 63 or 63A serves as the circumferential rib that increases the thickness of gear body 61 or 61A circumferentially. This increases the strength of internal gear 60 or 60A. When internal gear 60 or 60A is produced by resin molding and is removed from the mold, internal gear 60 or 60A does not contract easily, which leads to production of internal gear 60 or 60A with high accuracy. Internal gear 60 or 60A may be made of a synthetic resin having a hardness lower than the synthetic resin for forming housing body 40 or 40A. Synthetic resins for forming internal gear 60 or 60A and housing body 40 or 40A are preferably engineering plastics or super engineering plastics, from viewpoints of, for example, mechanical strength, wear resistance, and heat resistance. Examples of the synthetic resin include ultra-high molecular weight polyethylene (UHPE), polyphenylene sulfide (PPS), polyarylate (PAR), polyacetal (POM), polyamide (PA), polycarbonate (PC), polybutylene terephthalate (PBT), polyether sulfone (PES), and polyether ether ketone (PEEK).

Internal gear 60 or 60A and housing body 40 or 40A may be made of the same synthetic resin or may be made of different synthetic resins. The type of synthetic resin may be selected appropriately insofar as the above advantageous effects of the present invention can be obtained.

Among the above resins, a relatively soft synthetic resin is suitable for forming internal gear 60 or 60A. For this purpose, it is desirable to use ultra-high molecular weight polyethylene (UHPE), polyphenylene sulfide (PPS), polyarylate (PAR), polyacetal (POM), or polyamide (PA). A relatively hard synthetic resin is suitable for forming housing body 40 or 40A. Desirable examples for this purpose are polycarbonate (PC), polybutylene terephthalate (PBT), polyether sulfone (PES), polyphenylene sulfide (PPS), polyether ether ketone (PEEK), polyacetal (POM), and polyamide (PA).

In the present embodiment, internal gear 60 or 60A made of a synthetic resin having a hardness lower than that of the housing body 40 or 40A can alleviate the impact when internal gear 60 or 60A comes into contact with housing body 40 or 40A. In other words, internal gear 60 or 60A can lessen the vibration of housing body 40 or 40A. This can reduce the noise generated due to the vibration of the housing body 40 or 40A or due to internal gear 60 or 60A hitting the housing body 40 or 40A in the present embodiment. This can further reduce the noise generated by planetary gear device 20 or 20A due to the vibration of internal gear 60 or 60A and first gear train 81. In addition, flange 63 or 63A can reduce the occurrence of deformation of internal gear 60 or 60A due to contraction when internal gear 60 or 60A is formed, for example, from a low-hardness synthetic resin by resin molding. As a result, internal gear 60 or 60A can be manufactured with high precision.

In the present embodiment, the structure in which the internal gear is separated from the housing is applied only to the first-stage planetary gear train rotating at a high speed and not applied to the second-stage planetary gear train rotating at a low speed. In other words, in the present embodiment, the structure in which the internal gear is held in a suspended manner is adopted for the high-speed gear train of which the vibration and noise tend to increase, whereas the structure in which the internal gear is formed in the housing is adopted for the low-speed gear train of which the vibration and noise are relatively mild. Accordingly, in the present embodiment, the vibration and noise caused by the planetary gear-train section can be reduced while suppressing an increase in the number of components of the planetary gear device and suppressing an increase in the working hours and the cost of assembly. This leads to a reduction in the manufacturing cost of the planetary gear device. As described above, two different mechanisms can be adopted in accordance with the rotation mode of the planetary gear train, and the two different mechanisms can be present together.

In the case of the present invention being applied to a system having planetary gear trains of three reduction stages or more, the separation structure in which the internal gear is separated from the housing is applied to the highest-speed planetary gear train. This can reduce generation of vibration and noise effectively. The configuration of the housing having the internal gear formed on the inner circumferential surface thereof is applied to the lowest-speed planetary gear train because the vibration and noise generated are small. Accordingly, the separation structure is applied only where necessary, which can suppress an increase in the number of components and also in the working hours and the cost of assembly. Consequently, the production cost can be reduced.

In the above description of embodiments, the output shaft of motor 10 is coaxially connected to the coaxially disposed gears to transmit the power of motor 10 to output-shaft connection portion 87, and these gears are described as helical gears. The gears, however, may be gears of other types. For example, spur gears may be used in place of the helical gears. Compared with the helical gears, the spur gears tend to produce more backlash and play at the meshing point of gears. Even in this case, the vibration and noise can be reduced when the configuration of the present invention is applied to the planetary gear device.

In the description of the above embodiments, each planetary gear train of the planetary gear device is formed of three planetary gears. The present invention, however, is not limited to this configuration. For example, in the present invention, the planetary gear train of the planetary gear device may be formed of a single planetary gear or multiple planetary gears other than three.

The planetary gear device to which the present invention is applied can be used as a reduction gear or a speed-increasing gear for various machines or apparatuses, such as automobiles, robots, industrial machines, or toys.

REFERENCE SIGNS LIST

1 Actuator
10 Motor
11 Motor body
12 Shaft
20, 20A Planetary gear device
30, 30A Housing
40, 40A Housing body
41, 41A First accommodation section
42, 42A Second accommodation section
43 Tubular portion
44, 44A First tubular portion
45, 45A Stopper
46, 46A Step portion (movement restriction portion)
47, 47A Internal-gear teeth
48, 48A Second tubular portion
50, 50A Housing cover
50a Opening
51, 51A Tubular insertion portion (insertion portion)
53, 53A Bottom portion
54, 54A Engaging hook (engaging portion)
55, 444 Notch
55A Groove
56, 56A Flange
57, 57A Fixation protrusion
58, 58A Central projection
60, 60A Internal gear
61, 61A Gear body (tubular body)
62, 62A Internal-gear teeth
63, 63A Flange
65, 65A Recess
66A Guide protrusion
67, 67A Contact projection (contact portion)
70, 70A Planetary gear-train section
80 Gear unit
81 First gear train
82 Second gear train
87 Output-shaft connection portion
442, 442A Engagement hole (counterpart portion for engagement)
512 Opening edge portion (movement restriction portion)
534, 534A Annular positioning portion (movement restriction portion)
610, 610A Outer circumferential surface
632 Output-side surface
811, 821 Sun gear
812, 822 Planetary gear
813, 823 Carrier
813a, 823a Accommodation opening
816, 826 Pin
824 Gear-retention portion

The invention claimed is:

1. A separation structure of internal gear and housing, the separation structure comprising:
an internal gear including a tubular body that has an inner circumferential surface and internal-gear teeth formed on the inner circumferential surface; and
a tubular housing configured to accommodate the internal gear, wherein
the tubular body includes a flange formed on an outer circumferential surface of the tubular body and projecting radially outward,
the flange extends continuously and entirely circumferentially along the tubular body and includes a recess formed at an outer circumferential surface of the flange,
a gap is formed between the outer circumferential surface of the internal gear and an inner circumferential surface of the housing, and
contact between the recess of the flange and a projection of the housing restricts circumferential movement of the internal gear.

2. The separation structure of internal gear and housing according to claim 1, wherein contact between an end surface of the flange in an axial direction and a movement restriction portion of the housing restricts axial movement of the internal gear.

3. The separation structure of internal gear and housing according to claim 2, wherein
the housing includes
a housing body having the movement restriction portion, and
a housing cover attached to an opening of the housing body and including another movement restriction portion that is placed opposite to the flange in the axial direction together with the movement restriction portion on a side of the housing body, wherein
the flange includes a plurality of contact portions on one of opposite side surfaces distant from each other in the axial direction, the plurality of contact portions coming into line contact or point contact with the movement restriction portion, the one of opposite side surfaces opposing the movement restriction portion.

4. The separation structure of internal gear and housing according to claim 3, wherein
the flange is formed at one end of the tubular body of the internal gear and is positioned so as to oppose the movement restriction portion and to be capable of coming into contact with the movement restriction portion, and
the other end of the tubular body opposes a tubular insertion portion of the housing cover in the axial direction, the tubular insertion portion being configured to fit in an opening of the tubular body.

5. The separation structure of internal gear and housing according to claim 2, wherein the flange includes a plurality of contact portions on at least one of opposite side surfaces distant from each other in the axial direction in the flange, the at least one of the opposite side surfaces opposing the movement restriction portion, the plurality of contact portions coming into line contact or point contact with the movement restriction portion.

6. The separation structure of internal gear and housing according to claim 5, wherein the plurality of contact portions are formed on both of the opposite side surfaces.

7. The separation structure of internal gear and housing according to claim 5, wherein the plurality of contact portions are projections formed on the flange and arranged equidistantly from one another in the circumferential direction.

8. The separation structure of internal gear and housing according to claim 5, wherein at least one of the plurality of contact portions is shaped such that an area of a cross section orthogonal to the axial direction decreases gradually as the cross section comes closer to a tip end of the at least one of the plurality of contact portions.

9. The separation structure of internal gear and housing according to claim 1, wherein the recess is positioned, in the flange, radially outward from the outer circumferential surface of the tubular body.

10. The separation structure of internal gear and housing according to claim 1, wherein the flange is formed at a central portion of the tubular body of the internal gear in the axial direction.

11. The separation structure of internal gear and housing according to claim 1, wherein the recess is formed so as to extend in the axial direction between opposite end surfaces in the axial direction.

12. A planetary gear device, comprising:
the separation structure of internal gear and housing according to claim 1,
a single or a plurality of planetary gears meshing with the internal gear;
a sun gear positioned at a center of the single or the plurality of planetary gears and configured to mesh with the single or the plurality of planetary gears; and
a carrier configured to rotatably support the single or the plurality of planetary gears.

13. An actuator, comprising:
the planetary gear device according to claim 12; and
a motor connected to the planetary gear device and configured to drive the planetary gear device.

\* \* \* \* \*